United States Patent [19]

Gerling et al.

[11] Patent Number: 5,024,356

[45] Date of Patent: Jun. 18, 1991

[54] METHODS, SYSTEMS, APPARATUS AND ROTOR FOR APPLYING GRANULAR MATERIAL

[75] Inventors: Joseph F. Gerling, West Grove, Pa.; Raymond A. Kaczmarczyk, Jr., Wilmington, Del.

[73] Assignee: E. I. du Pont de Nemours and Company, Wilmington, Del.

[21] Appl. No.: 311,516

[22] Filed: Feb. 16, 1989

[51] Int. Cl.$^5$ .............................................. B65D 88/54
[52] U.S. Cl. ..................................... 222/312; 222/410
[58] Field of Search ............................... 239/654–656, 239/670; 222/610, 613–615, 624–625, 626–627, 292, 311–312, 314, 317, 333, 342, 352, 368, 411

[56] References Cited

U.S. PATENT DOCUMENTS

| | | | |
|---|---|---|---|
| 2,141,512 | 12/1938 | Carr | 222/312 |
| 3,163,333 | 12/1964 | Lindaberry | 222/311 X |
| 3,568,937 | 3/1971 | Grataloup | 239/655 |
| 3,606,965 | 9/1971 | Cortelyou et al. | 222/312 |
| 3,631,825 | 1/1972 | Weiste | 111/11 |
| 3,926,377 | 12/1975 | Johnson | 239/655 |
| 4,024,822 | 5/1977 | Ross et al. | 111/34 |
| 4,053,088 | 10/1977 | Grataloup | 222/312 |
| 4,142,685 | 3/1979 | Dreyer et al. | 239/655 |
| 4,215,824 | 8/1980 | Weiste | 239/655 |
| 4,277,205 | 7/1981 | Meunier | 406/123 |
| 4,376,601 | 3/1983 | Laseter | 406/64 |
| 4,405,089 | 9/1983 | Taylor | 239/656 |
| 4,530,462 | 7/1985 | Andersson | 239/7 |
| 4,562,968 | 1/1986 | Widmer et al. | 239/655 |
| 4,569,486 | 2/1986 | Balmer | 239/655 |
| 4,705,433 | 11/1987 | Brännstrom | 406/63 |
| 4,767,062 | 8/1988 | Fletcher | 239/655 |

FOREIGN PATENT DOCUMENTS

| | | | |
|---|---|---|---|
| 631134 | 12/1927 | France | 222/342 |
| 645093 | 4/1937 | German Democratic Rep. | 222/342 |
| 103708 | 2/1942 | Sweden | 222/352 |
| 397543 | 8/1933 | United Kingdom | 222/312 |

*Primary Examiner*—Michael S. Huppert
*Assistant Examiner*—Kenneth Bomberg

[57] ABSTRACT

Methods, systems, apparatus and a rotor are provided for metering, conveying and dispensing granular materials and/or liquids. The systems, apparatus and rotor can be used for metering, conveying and dispensing granular materials onto a plurality of zones and/or liquids onto a plurality of regions.

11 Claims, 18 Drawing Sheets

METHODS, SYSTEMS, APPARATUS AND ROTOR FOR APPLYING GRANULAR MATERIAL

BACKGROUND OF THE INVENTION

1. Field of the Invention

This invention relates to methods, systems, apparatus and a rotor for metering, conveying and dispensing granular materials and/or liquids and, in particular, to methods, systems, apparatus and a rotor for metering, conveying and dispensing granular materials onto a plurality of zones and/or liquids onto a plurality of regions.

2. Description of Related Art.

Various forms of devices for applying particulate or liquid pesticides or the like are known. These can comprise structures for mounting on a motorized vehicle or a pull-type vehicle.

U.S. Pat. No. 4,630,773 discloses a device for spreading granular fertilizer, liquid herbicide and liquid insecticide. The device is on a motorized vehicle and has a plurality of product bins and liquid tanks. Feeder devices meter granular products from the bins under computer control onto a conveyor through a single rotary spreader onto an area of the ground. Such devices spread material on a relatively narrow strip of ground generally requiring multiple passes by the vehicle.

U.S. Pat. No. 4,569,486 discloses a pneumatic device for distributing particulate material such as fertilizer, herbicide or seeds on a pull-type vehicle with booms which extend to one or the other side of the vehicle. Such devices are useful on open territory such as farmland. However, the vehicle cannot pass near obstructions like signs, poles or trees without altering the position of the booms requiring either a change in vehicle path to avoid the obstructions or time and effort to change the position of the booms.

Such devices are designed to apply numerous products, such as seeds, fertilizers, pesticides including herbicides, insecticides and fungicides, and other agricultural chemicals. The product per unit area dispensing rate varies greatly depending on the product being applied. The pesticides typically applied in the past have active ingredient concentrations of about 15% or less by weight. This requires such pesticides to be applied at high product per unit area rates, such as greater than 10 pounds per acre (11.2 Kg/ha) and more typically 20 to 30 pounds per acre (22.4 to 33.6 Kg/ha). Other products, such as fertilizers, often require application rates of several hundred pounds per acre. Since previous product application rates are so high, the dispensing devices have not needed to be able to accurately meter and uniformly apply small quantities of dry granular material.

There are granular materials available having about 60% to about 80% concentration by weight of active ingredients. Some of these materials need only be applied at rates of a fraction of an ounce per acre to about one pound per acre, such as Oust®, Escort® and Telar®, all commercially available from E. I. du Pont de Nemours and Company with offices in Wilmington, Delaware. Other of these materials need only be applied at about one pound per acre (1.1 Kg/ha) to about 10 pounds per acre (11.2 Kg/ha), such as Karmex® and Krovar®, both also available from E. I. du Pont de Nemours and Company. See U.S. Pat. Nos. 4,127,405, 4,383,113, 4,394,506, 4,481,029, and 4,420,325 for a further description of sulfonylurea herbicides which are granular materials that can be applied at application rates less than about 10 pounds per acre (11.2 Kg/ha).

In the past, products, such as pesticides, were frequently applied to the ground with liquid, such as water, for many reasons. Dry granular materials are frequently pulsed through metering devices resulting in an uneven application of the product on the ground. Dry granular materials are easily broken up in systems causing the product to be more easily blown away by the wind once released from the dispensing system. Existing devices can not apply product far, i.e., greater than about 10 or 20 feet, from a point of release on a dispensing vehicle without spraying the product in a liquid form. However, carrying the liquid reduces space for the actual product and, thus, increases application costs.

In view of the high concentrate granular materials available today and the cost savings associated with applying a product in granular form, it is desirable to provide a system for applying products in the form of dry granular material(s) at low application rates including less than 10 pounds per acre (11.2 Kg/ha) to as low as about one ounce per acre (1.1 Kg/ha).

Unique needs exist in applying pesticides near railroad tracks. For instance, different pesticides may best be applied on different zones or regions that vary with distance from the centerline between the railroad tracks. It is also desirable to have the ability to apply different rates of the same or different product(s) to different zones along the tracks. At certain locations along tracks, such as near intersections with roads, it is desirable to apply pesticides on wider strips of land from the tracks than other track locations. Obstructions, such as signs, trees, fences and poles, are common along railroad tracks making the use of extended booms impractical.

Therefore, it is desirable to provide a boomless system for applying products in the form of dry granular materials, especially along railroad tracks, where different products can be applied at different rates on different zones substantially without pulsing or attrition of the material.

However, some products may only be available in liquid form or, for some reason, it may be preferred to apply a product in liquid form. Therefore, it is desirable to provide a system for applying at least one dry granular material at rates less than about 10 pounds per acre (11.2 Kg/ha) to about one ounce per acre (1.1 Kg/ha) without pulsing or attrition of the material onto a plurality of zones and/or at least one liquid onto a plurality of regions.

SUMMARY OF THE INVENTION

This invention relates to a metering rotor for use in metering granular material comprising:

a rotor having an axis of rotation and an outer circumferential surface having indentations arranged in the surface in circumferential rows with each of the rows offset with respect to adjacent rows such that any radial plane including the axis contains a substantially constant cross section of the indentations.

This invention further relates to an apparatus for metering granular material substantially without pulsing and attrition comprising:

a rotor having an axis of rotation and an outer circumferential surface having indentations arranged in the surface in circumferential rows with each of the rows offset with respect to adjacent rows such that any radial plane including the axis contains a substantially constant cross section of the indentations;

a housing for partially enclosing and supporting the rotor, the housing having a first and a second opening, each of the openings providing access to the rotor surface, the openings spaced from one another;

a gate having a cylindrical surface positionable between the housing and the rotor to selectively control the size of the first housing opening; and a blocking mechanism positioned adjacent the rotor cylindrical surface to prevent excess material from entering the first housing opening, whereby when the material is fed by gravity to the first housing opening, the rotor is rotated with respect to the gate and the housing, and the gate is positioned to open the first housing opening, then the material is metered through the apparatus and out the second housing opening.

This invention further relates to a system for applying at least one granular material substantially uniformly, substantially without pulsing or attrition, onto a plurality of substantially different zones, comprising:

a hopper having a plurality of compartments, each of the compartments having an inlet and outlets, the hopper for receiving at least one of the granular materials in each of the compartments;

means for metering the granular material(s) connected to each of the outlets;

a collection trough having a plurality of sections, each of the sections having an outlet and positioned to receive the granular material(s) from at least one of the metering means; and means for conveying and dispensing the material(s) from each of the outlets of the collection trough onto one of the substantially different zones, such that the material(s) are applied substantially uniformly to the zones substantially without pulsing and attrition.

This invention further relates to a system for applying at least one granular material substantially uniformly, substantially without pulsing or attrition, onto a plurality of substantially different zones and/or at least one liquid onto a plurality of substantially different regions, comprising:

means for storing the liquid(s);

means connected to the storing means for conveying and dispensing the liquid(s) onto the plurality of substantially different regions;

a hopper having a plurality of compartments, each of the compartments having an inlet and outlets, the hopper for receiving at least one of the granular materials in each of the compartments;

means for metering the granular material(s) connected to each of the outlets;

a collection trough having a plurality of sections, each of the sections having an outlet and positioned to receive the granular material(s) from at least one of the metering means; and means for conveying and dispensing the material(s) from each of the outlets of the collection trough onto one of the substantially different zones, such that the material(s) are applied substantially uniformly to the zones substantially without pulsing and attrition.

The invention is further directed to a method of applying at least one granular material onto a plurality of substantially different zones, comprising the steps of:

metering the material(s) from outlets of compartments of a hopper to sections of a collection trough; and conveying and dispensing the materials from outlets of the collection trough through points of release onto the plurality of substantially different zones, such that the material(s) are applied substantially uniformly to the zones substantially without pulsing or attrition.

BRIEF DESCRIPTION OF THE DRAWINGS

The invention can be more fully understood from the following detailed description thereof in connection with accompanying drawings which form a part of this application and in which.

DESCRIPTION OF THE PREFERRED EMBODIMENT(S)

Figure 1:
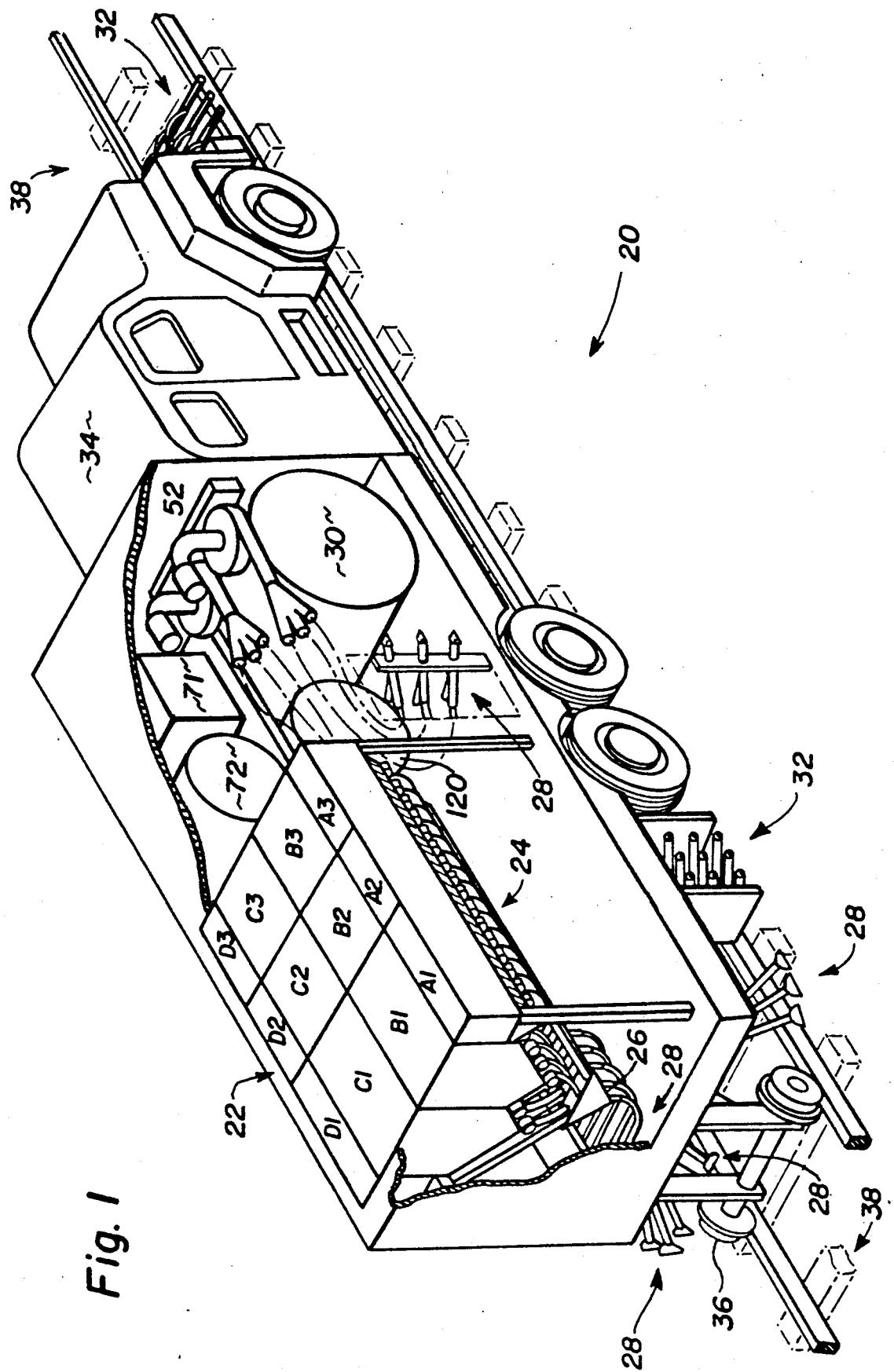
FIG. 1 is a schematic perspective view of a system for applying at least one granular material substantially without pulsing or attrition onto a plurality of substantially different zones and/or at least one liquid onto a plurality of substantially different regions in accordance with the present invention.

Throughout the following detailed description, similar reference numerals refer to similar elements in all Figures of the drawings.

Referring to FIG. 1, there is illustrated a schematic perspective view of a system 20 for applying at least one granular material at low application rates including less than 10 pounds per acre (11.2 Kg/ha) to as low as about one ounce per acre (70 gr/ha) substantially without pulsing or attrition onto a plurality of substantially different zones and/or at least one liquid onto a plurality of substantially different regions in accordance with the present invention.

The applying system 20 includes a hopper 22 for receiving the granular materials, means for metering 24 the granular materials from the hopper 22, a collection trough 26 for receiving the materials from the metering means 24, means for conveying and dispensing 28 the materials from the trough 26, means for storing 30 the liquid(s), and means for conveying and dispensing 32 the liquid(s) from the storing means 30. The system 20 is preferably supported on a vehicle 34, such as a truck, having extendible railroad wheel assemblies 36 for traveling on railroad tracks 38.

In a preferred embodiment, the hopper 22 has a plurality of compartments designated A1, A2, A3, B1, B2, B3, C1, C2, C3, D1, D2, and D3 in FIG. 1. Each of the compartments are adapted to receive and hold at least one granular material. All of the compartments may hold the same material(s). Alternatively, different compartments may hold different material(s).

Figure 2:
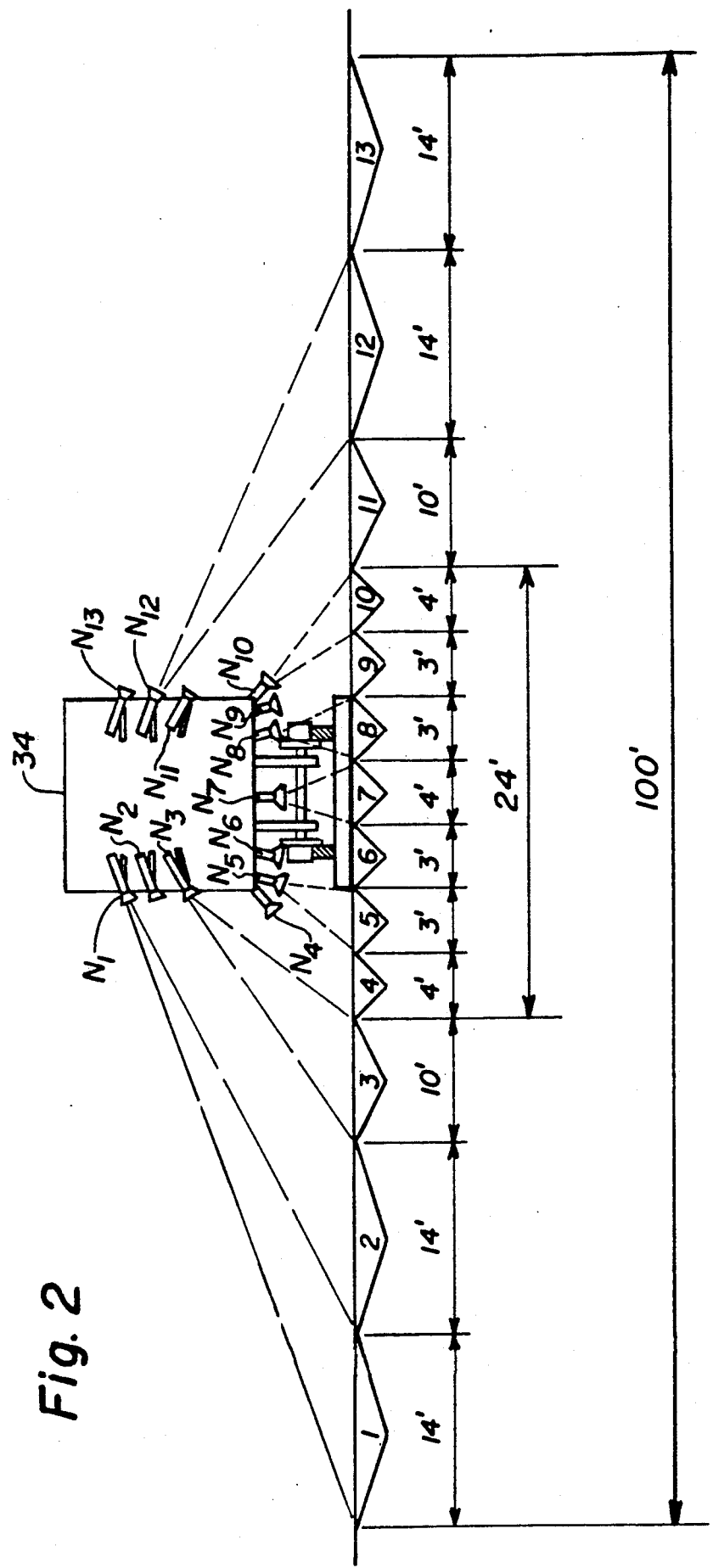
FIG. 2 is a schematic representation of the rear of the applying system illustrating the plurality of substantially different zones and the general location of nozzles on the system that dispense granular material on the plurality of zones.

Referring to FIG. 2, there is shown a schematic representation of the rear of the vehicle 34 supporting the applying system 20 illustrating the plurality of substantially different zones designated in 20 the Figure by the numbers 1-13 and the general location of nozzles $N_1$-$N_{13}$ on the system that dispense granular material on the plurality of zones 1-13. When the vehicle 34 travels in a straight path, the zones are strips on the ground that are generally parallel and substantially adjacent to one another.

There can be any number of zones and there is at least one nozzle positioned on the vehicle 34 to spray granular material on each of the zones. In a preferred embodiment shown in FIG. 2, there are 13 zones and one nozzle for each zone. The zones 1-13 are symmetric about a point on the ground corresponding to the center of the vehicle 34. The nozzle $N_1$ is positioned to spray granular material onto the zone 1. The nozzle $N_2$ is positioned to spray granular material onto the zone 2. The nozzle $N_3$ is positioned to spray granular material onto the zone 3. The nozzle $N_4$ is positioned to spray granular material onto the zone 4. The nozzle $N_5$ is positioned to spray granular material onto the zone 5. The nozzle $N_6$ is positioned to spray granular material onto the zone 6. The nozzle $N_7$ is positioned to spray granular material onto the zone 7. The nozzle $N_8$ is positioned to spray granular material onto the zone 8. The nozzle $N_9$ is positioned to spray granular material onto the zone 9. The nozzle $N_{10}$ is positioned to spray granular material onto the zone 10. The nozzle $N_{11}$ is positioned to spray granular material onto the zone 11. The nozzle $N_{12}$ is positioned to spray granular material onto the zone 12. The nozzle $N_{13}$ is positioned to spray granular material onto the zone 13.

In the embodiment illustrated in FIG. 2, from left to right zone 1 is about 14 feet (4.27 meters) wide, zone 2 is about 14 feet (4.27 meters) wide, zone 3 is about 10 feet (3.05 meters) wide, zone 4 is about 4 feet (1.22 meters) wide, zone 5 is about 3 feet (0.91 meters) wide, zone 6 is about 3 feet (0.91 meters) wide, zone 7 is about 4 feet (1.22 meters) wide, zone 8 is about 3 feet (0.91 meters) wide, zone 9 is about 3 feet (0.91 meters) wide, zone 10 is about 4 feet (1.22 meters) wide, zone 11 is about 10 feet (3.05 meters) wide, zone 12 is about 14 feet (4.27 meters) wide, and zone 13 is about 14 feet (4.27 meters) wide. Thus, nozzles $N_4$-$N_{10}$ spray material on a 24 foot (7.32 meter) wide path and all the nozzles cover a 100 foot (30.48 meter) wide path.

Figure 3:
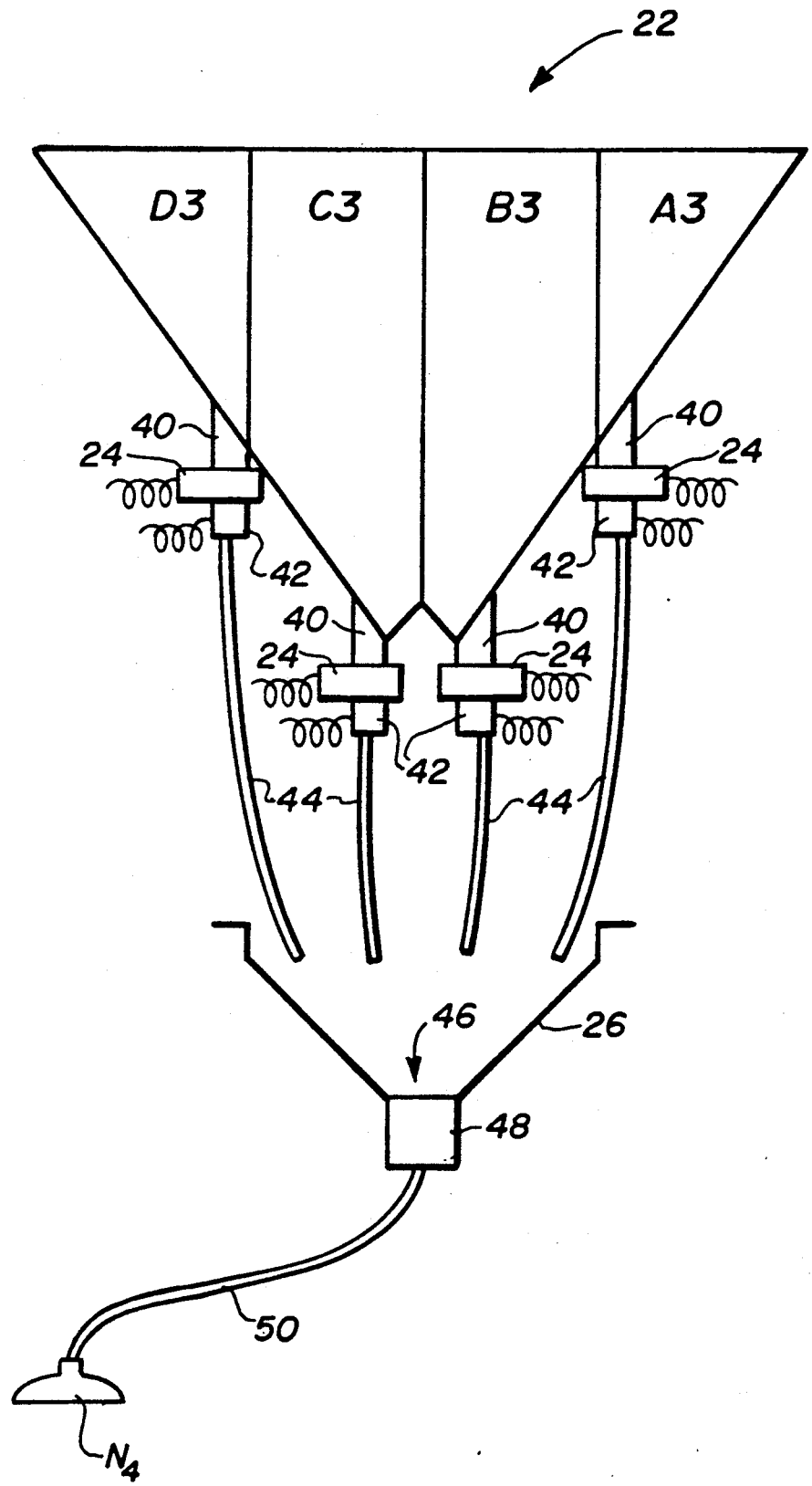
FIG. 3 is a schematic illustration showing the material flow in the system from a hopper through the nozzles for zones 4 through 10.

FIG. 3 is a schematic illustration showing the material flow in a preferred embodiment of the system 20 from the compartments A3, B3, C3 and D3 of the hopper 22 through the nozzles $N_4$ through $N_{10}$ for spraying onto zones 4 through 10, respectively. Each of the compartments of the hopper 22 has an inlet and at least one outlet 40 positioned at substantially the bottom of the compartment. A metering device or means for metering 24 is connected to each of the hopper outlets 40. A material flow sensor 42 is positioned beneath each metering device 24 to sense the flow of material exiting from the metering device 24 and to provide an electrical signal representative of the sensed flow. Any material flow sensor may be used as long as it serves these functions.

One material flow sensor that has been found satisfactory is described as follows. The flow sensor may comprise a piezoelectric device (such as Panosonic omnidirectional electret condenser microphone part number p9932 available from Digi-Key Corp., with offices in Thief River Falls, Minnesota) to detect the impact of granules as they fall through material delivery tubes 44. The microphone can be installed to slightly protrude into the tube 44 at an angle of about 30° from vertical. It is connected to a control circuit which monitors the number of impacts per unit time and sends a "flow" or "no flow" signal to a main control module 270.

Hoses, tubes or conduits 44 can be used to direct the fall of the granular material from the sensors 42 to a section of the collection trough 26. Each of the sections of the collection trough 26 is positioned to receive the granular material(s) from at least one of the metering means 24. It has been found that the material falling from the hoses 44 sufficiently mixes itself due to the dispersion from the hoses 44. However, a mixing device can be adapted to mix the material in each section of the collection trough 26. Each section of the collection trough 26 has at least one outlet at or near its bottom. An airmover 48 is connected to each of the outlets 46 of the trough 26 to receive the mixed material falling out of the trough outlets 46. The term "airmover" as used herein is intended to include any means for pneumatically moving the material. An illustrative airmover that can be used in the present system is commercially available under model number AM750D from Nortel Machinery, Inc., located at Buffalo, New York. One end of a hose or conduit 50 is connected to each of the airmovers 48 to direct the material to and then through one of the nozzles, e.g., nozzle $N_4$, which is connected to the other end of the hose 50. Any nozzle can be used for the nozzles $N_4$–$N_{10}$ as long as it provides relatively uniform dispersion of the granular material over the zone being sprayed. For uniformly spraying granular material at low application rates including less than 10 pounds per acre (11.2 Kg/ha) to as low as about one ounce per acre (70 gr/ha) substantially without pulsing or attrition onto the zones 6–8 having the dimensions illustrated in FIG. 2, it has been found satisfactory to use as the nozzle Upholstery Tool model no. 68-34691 sold by Eureka with offices at Bloomington, Illinois. For uniformly spraying granular material at low application rates including less than 10 pounds per acre to as low as about one ounce per acre substantially without pulsing or attrition onto the zones 5 and 9 having the dimensions illustrated in FIG. 2, it has been found satisfactory to use as the nozzle ShopVac Car Tool model no. 90105 sold by Shop Vac with offices at Williamsport, Pennsylvania. For spraying similar material(s) at low application rates including less than 10 pounds per acre to as low as about one ounce per acre substantially without pulsing or attrition on zones 4 and 10, it has been found satisfactory to use as the nozzle Crevice Tool part no. 14-078 also sold by Eureka. Preferably, the airmover 48 generates an air stream in the range of about 50 through 70 miles (80.47 through 112.65 Km) per hour at the release point of the nozzles $N_4$–$N_{10}$.

If one wants to spray the same material(s) on more than one zone, then the material(s) for these zones can be supplied from the same trough section and, thus, the same hopper compartment outlet(s) 40. However, it is preferred that the collection trough 26 have as many sections as there are nozzles or zones and that each section be adapted to receive material from at least four compartments of the hopper 22 as illustrated in FIG. 3.

Each one of the metering devices is controllable such that it can be turned on or off by the operator and it meters granular material at a rate proportional to the speed of the vehicle 34. Thus, assuming that each one of the compartments A3, B3, C3 and D3 holds a different granular material in it, then material from any one or any combination of the compartments A3, B3, C3 and D3 can be sprayed onto each one of the zones 4 through 10 when the vehicle 34 is moving.

Figure 4:
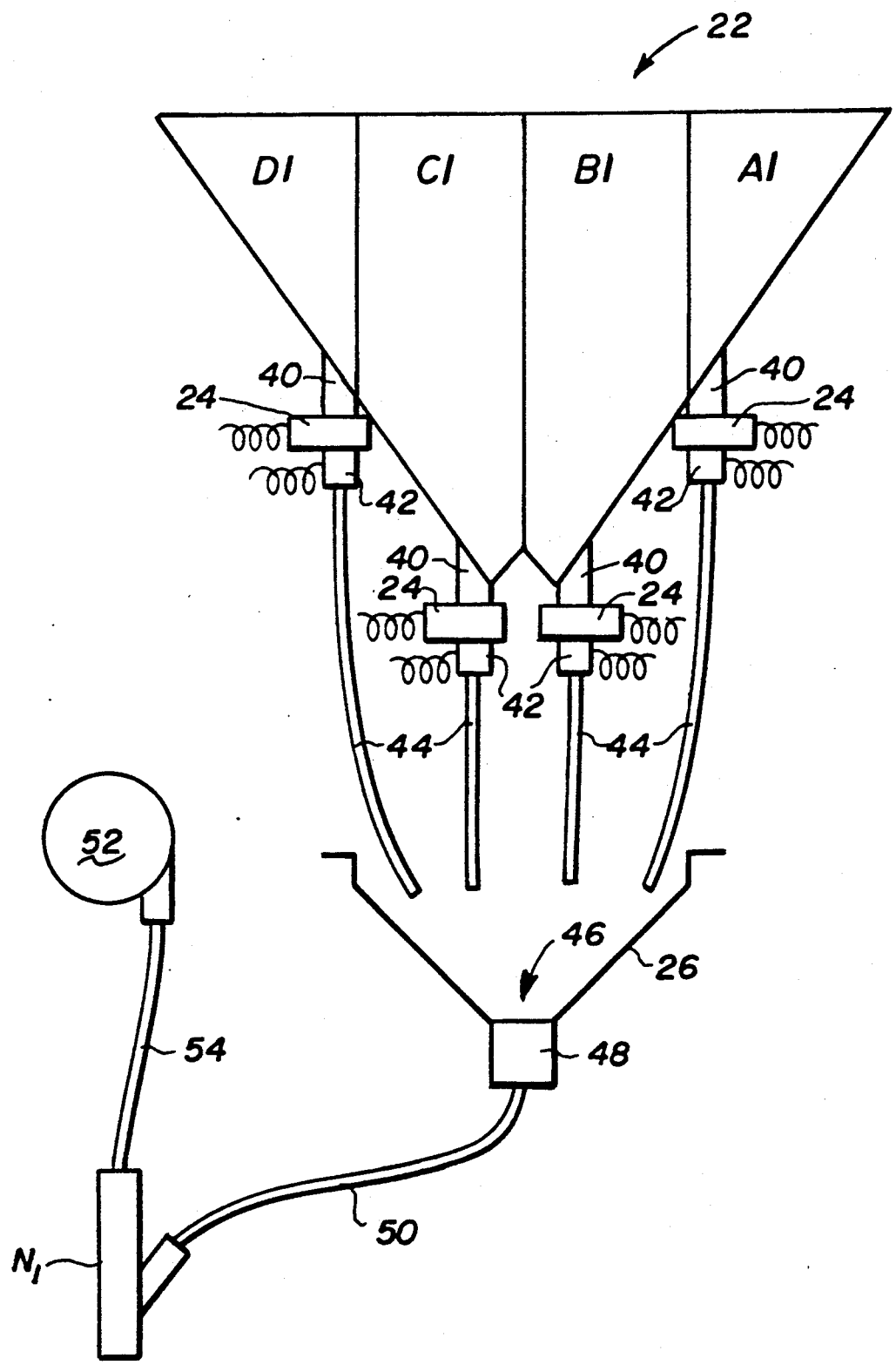
FIG. 4 is a schematic illustration showing the material flow in the system from the hopper through the nozzles for zones 1, 2, 12 and 13.

Referring to FIG. 4, there is depicted a schematic illustration showing the material flow in the system 20 from the hopper 22 through the nozzles $N_1$–$N_3$ and $N_{11}$–$N_{13}$ for zones 1, 2, 3, 11, 12 and 13, respectively. The material flow path in FIG. 4 is the same as in FIG. 3, except in addition to the airmover 48 providing acceleration to the material(s) an air blower 52 is connected to the respective nozzles, e.g., nozzle 1, by a hose or conduit 54 to spray the material(s) to zones farther from the vehicle 34. The term "air blower" is intended herein to mean any pneumatic means for providing additional acceleration to the material. FIG. 4 illustrates the material flow from the compartments A1, B1, C1 and D1. The material flow from the compartments A2, B2, C2 and D2 is the same as shown in FIG. 4, except for the distinctions illustrated in FIG. 5.

Figure 5:
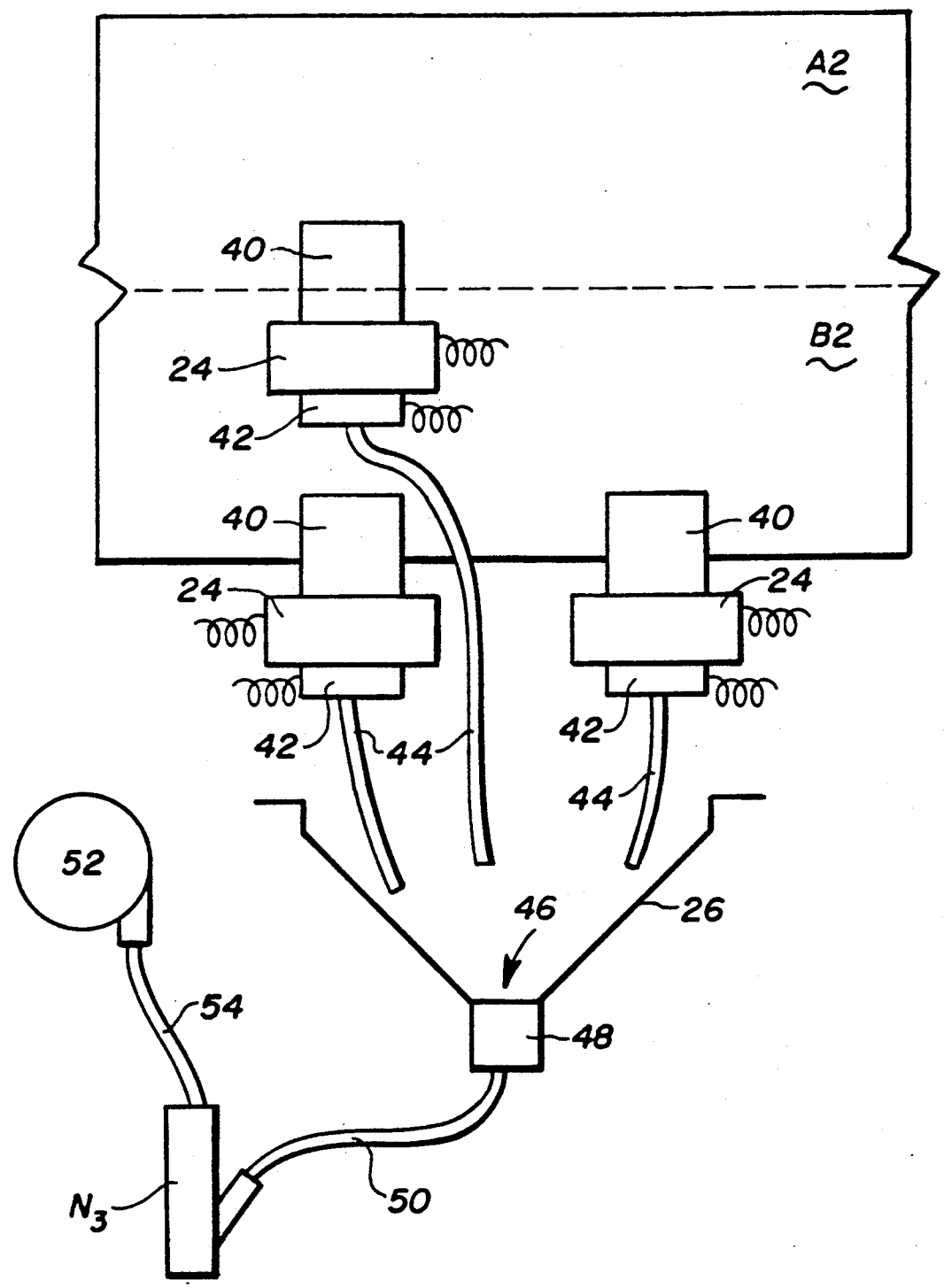
FIG. 5 is a schematic illustration showing a side view of the material flow in the system from the hopper through the nozzles for zones 3 and 11.

FIG. 5 is a schematic illustration showing a side view of the material flow in the system from the hopper 22 through the nozzles $N_3$ and $N_{11}$ for zones 3 and 11, respectively. For zones 3 and 11, two outlets 40 are provided from the compartments B2 and C2. Assuming identical metering devices 24 are connected to each of the outlets on the hopper 22, this enables twice as much material from the compartments B2 and C2 to be fed into the sections of the trough 26 feeding material(s) to nozzles 3 and 11.

Preferably, the combined air velocity generated by the airmovers 48 and the air blowers 52 cause air streams in the range of about 150 through 200 miles (241.4 through 321.9 Km) per hour at the release point from the nozzles $N_1$–$N_3$ and $N_{11}$–$N_{13}$. An acceptable air blower for the present system 20 is commercially available from Paxton Blowers with offices at Santa Monica, California, under model number RM97A.

Figure 6:
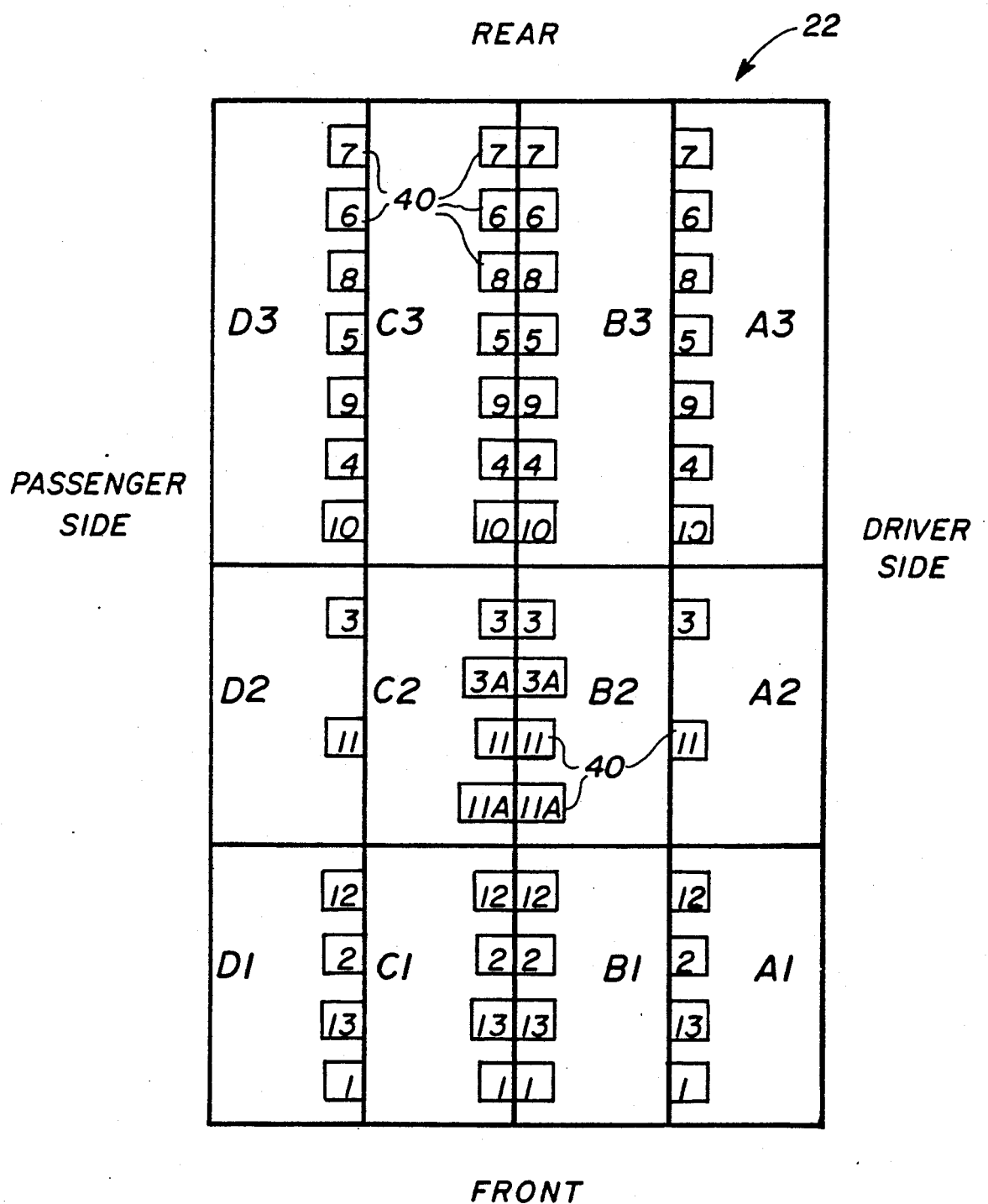
FIG. 6 is a schematic representation of a top view of the system hopper showing that it has a plurality of compartments and that each compartment has at least one outlet.

Referring to FIG. 6, there is a schematic representation of a top view of the system hopper 22 showing that it has a plurality of compartments A1, A2, A3, B1, B2, B3, C1, C2, C3, D1, D2, and D3 and that each compartment has at least one outlet 40. The numbers in the outlets 40 represent the zone number that can be supplied by the outlet. Each set of the outlets 40 in the compartments A3, B3, C3 and D3 with the same numbers in them, e.g., 7, can provide materials to a corresponding section of the trough 26 and then through a corresponding nozzle, e.g., $N_7$, onto a corresponding one of the zones, e.g., 7, as illustrated in relation to FIG. 3. Similarly, each set of the outlets in the compartments A1, B1, C1 and D1 having the same number in them, e.g., 12, are adapted to provide materials to a section of the collection trough 26 and then through the corresponding nozzle, e.g., $N_{12}$, onto the corresponding zone, e.g., 12, as illustrated in FIG. 4. Finally, each set of the outlets in the compartments A2, B2, C2 and D2 having the numbers 3 plus 3A or 11 plus 11A in them are adapted to provide materials to a section of the collection trough 26 and then through the corresponding nozzle, e.g., $N_3$ or $N_{11}$, onto the corresponding zone, e.g., 3 or 11, as illustrated in FIGS. 4 and 5.

FIG. 6 further shows a preferred layout or positioning of the compartments A1, A2, A3, B1, B2, B3, C1, C2, C3, D1, D2, and D3 and the outlets 40 with respect to the vehicle 34. The compartments form a matrix of rows designated by the numbers 1, 2 and 3, and columns designated by the letters A, B, C and D. The row of the compartments A1, B1, C1 and D1 is closest to the front of the vehicle 34. Whereas, the row of the compartments A3, B3, C3 and D3 is closest to the rear of the vehicle 34. The column of the compartments A1, A2 and A3 is closest to the driver side of the vehicle 34. Adjacent to the A column is the B column. Adjacent to the B column is the C column. The D column is the closest to the passenger side of the vehicle 34. From front to back, the outlets are adapted to supply material to the following zones: 1, 13, 2, 12, 11 (two outlets are provided in compartments B2 and C2 for this purpose), 3 (two outlets are provided in compartments B2 and C2 for this purpose), 10, 4, 9, 5, 8, 6, and then 7.

Figure 7:
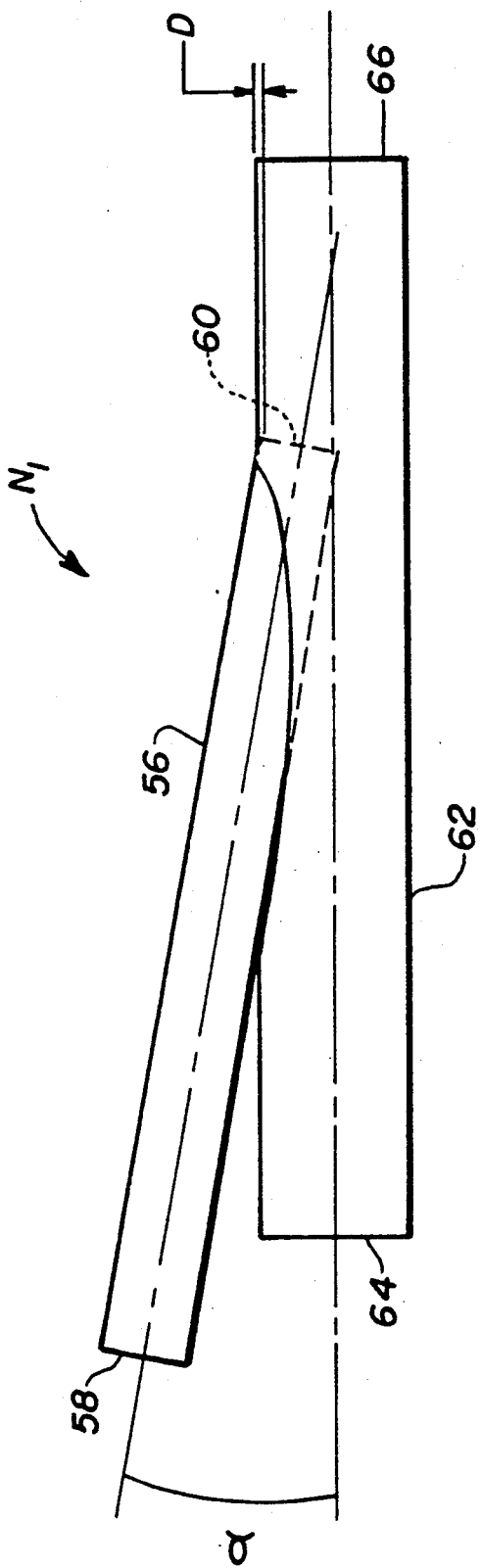
FIG. 7 is a side view of a nozzle that can be used for dispensing granular material onto zones 1, 2, 3, 11, 12, and 13.

FIG. 7 is a side view of a nozzle, e.g., $N_1$, that can be used for dispensing dry granular material(s) at low application rates including less than 10 pounds per acre to as low as about one ounce per acre substantially without pulsing or attrition onto zones 1, 2, 3, 11, 12, and 13. All of the nozzles $N_1$–$N_{13}$ are part of the conveying and dispensing means 28, but only the nozzles $N_1$, $N_2$, $N_3$, $N_{11}$, $N_{12}$, and $N_{13}$ that apply material onto zones 1, 2, 3, 11, 12, and 13, respectively, include means for introducing a first air stream carrying granular material at a first speed into a second air stream at a second speed substantially without attrition of the material. More specifically, the nozzle $N_1$, for instance, comprises a first tube or pipe 56 having a first inlet end 58 and a second outlet end 60 and a second tube or pipe 62 having a first inlet end 64 and a second outlet end 66. Preferably, the tubes 56 and 62 are cylindrical and the diameter of the second tube 62 is about twice the diameter of the first tube 56. The exterior of the first tube 56 is connected to an edge 68 defining a hole in the side of the second tube 62. The inlet end 60 of the first tube 56 preferably extends slightly into the interior of the second tube 62 such that there is a distance D between the inlet end 60 and the second tube 62. Furthermore, preferably the first and second tubes 56 and 62 have longitudinal axes that intersect with each other at an angle $\alpha$ of about 10°. The inlet end 58 of the first tube 56 is for connection to the hose 50 which is also connected to the airmover 48. The inlet end 64 of the second tube 62 is for connection to the hose 54 which is also connected to the air blower 52. See FIG. 5.

Figure 8:
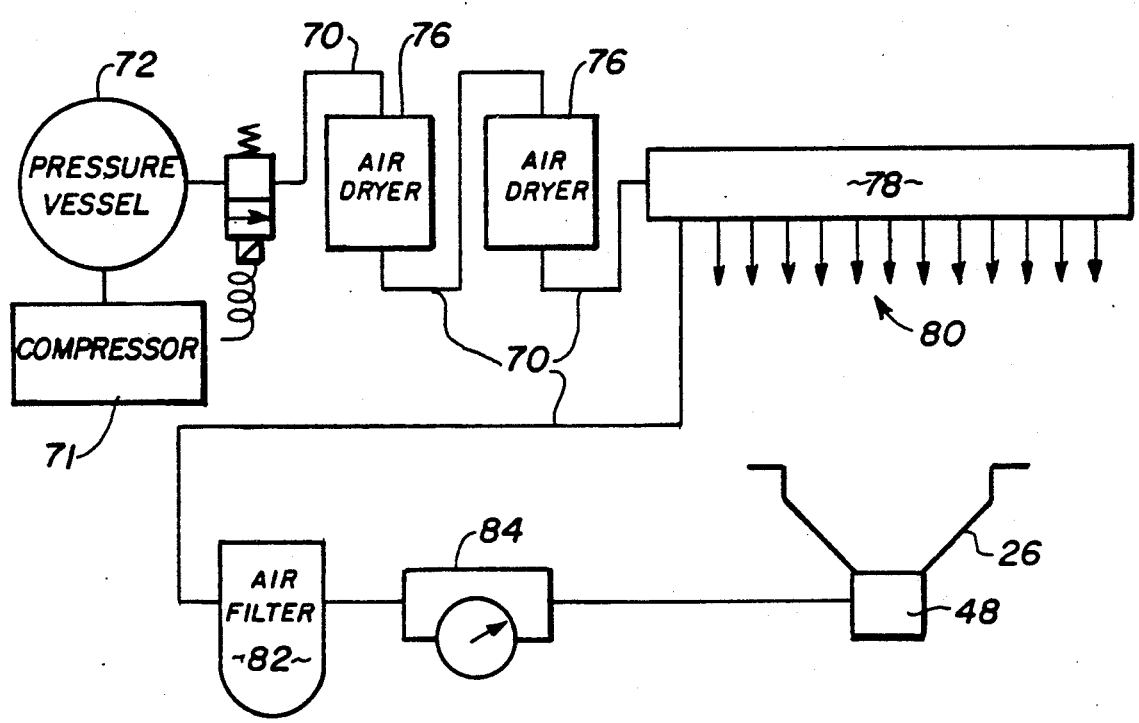
FIG. 8 is a schematic representation of a first part of the applying system's pneumatic system.

FIG. 8 is a schematic representation of a first part of the applying system's pneumatic system. Air is supplied through a line 70, such as, by a compressor 71 through a pressure vessel 72. A solenoid valve 74 is positioned in the line 70 to turn the air on or off. Preferably, one or more air dryers 76 is or are positioned to dry the air in the line 70. The line 70 is connected to a manifold 78 having a plurality of outlets 80, one of the outlets 80 for each section of the collection trough 26 which in a preferred embodiment is 13. More specifically, one of the manifold outlets 80 is connected by the line 70 to each of the airmovers 48. An air filter 82 and/or an air pressure regulator 84 may be positioned in the line 70.

Figure 9:
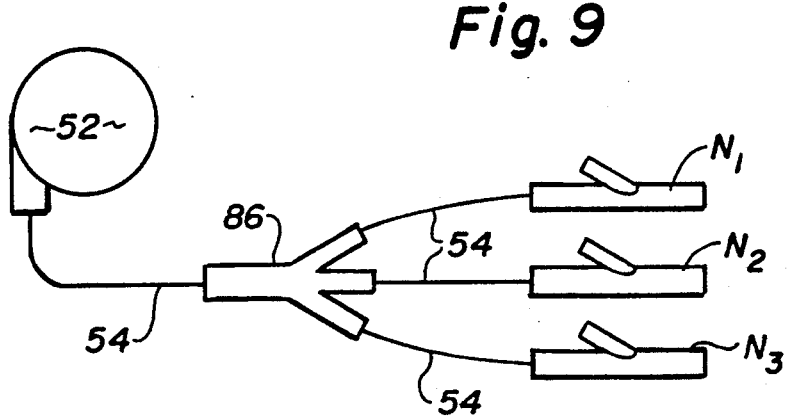
FIG. 9 is a schematic representation of a second part of the conveying and dispensing system's pneumatic system.

FIG. 9 is a schematic representation of a second part of the applying system's pneumatic system. In a preferred embodiment, two of the air blowers 54 are used. The air blowers 54 can be chosen to be powered by the system's 20 hydraulic system. One air blower 52 is used as illustrated in FIG. 9 to supply air to the nozzles $N_1$, $N_2$, and $N_3$. Similarly, another one of the air blowers 52 is used to supply air to the nozzles $N_{11}$, $N_{12}$ and $N_{13}$. More specifically, each one of the air blowers 52 is connected by a hose or conduit 54 to a splitter 86 which divides the air into three hoses 54. Each one of the hoses 54 is connected to the inlet end 64 of one of the nozzle tubes 62.

Figure 10:
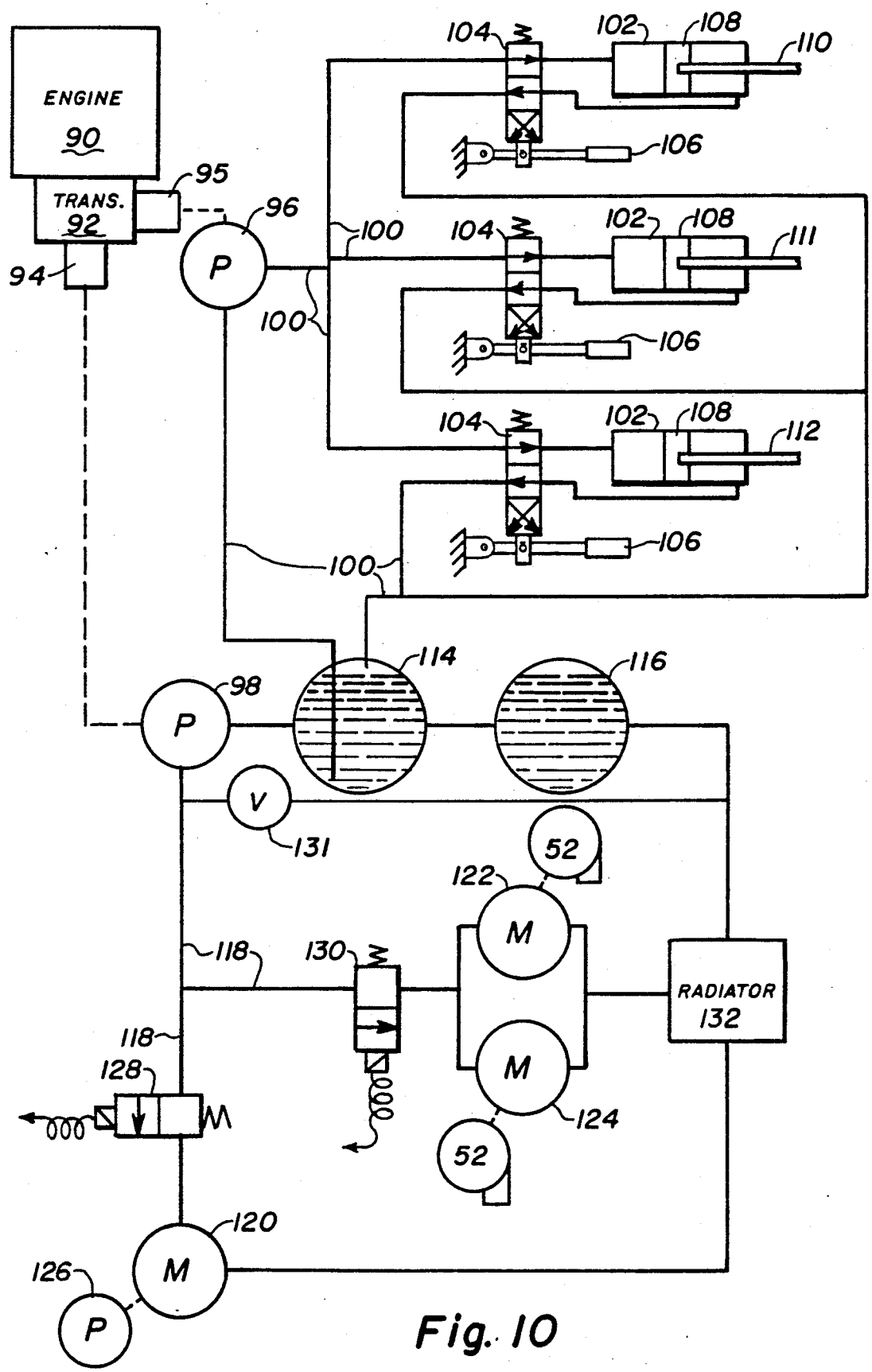
FIG. 10 is a schematic representation of the applying system's hydraulic system.

FIG. 10 is a schematic representation of the applying system's hydraulic system. The vehicle engine 90 provides the power for the system's 20 hydraulic system. A first power take-off mechanism 95 is connected to the transmission 92 of the vehicle engine 90. The power take-off mechanism 95 is operable such as by a lever within the cab of the vehicle 34. Such power take-off mechanisms are well known and, thus, need not be described in any further detail. The power take-off mechanism 95 is connected to and energized a first hydraulic pump 96 for circulating hydraulic fluid or liquid to operate the extendible railroad wheel assemblies 36.

The pump 96 supplies the fluid from a reservoir 114 through lines 100 to one or more hydraulic cylinders 102. Valves 104 operable, for instance, by manual levers 106, are positioned in the lines 100 to control supplying the fluid to one or the other end of the cylinders 102 and to return the fluid from the opposite end of the cylinders 102 to the reservoir 114. With the valves 104 positioned as illustrated in FIG. 10, the fluid enters the cylinders 102 pushing the pistons 108 to their extended positions lowering the extendible railroad wheel assemblies 36. When the valves 104 are moved by the levers 106 to their second positioned, fluid is supplied from the first pump 96 to move the pistons 108 to their contracted or non-extended positions raising the railroad wheel assemblies 36. In a preferred embodiment, one of the pistons 108 is connected by a rod 110 to a front railroad wheel assembly 36 including two railroad wheels for the front of the vehicle 34. Further, one of the pistons 108 is connected by a rod 111 to one of the vehicle rear railroad wheels and another one of the pistons 108 is connected by a rod 112 to another one of the vehicle rear railroad wheels in the rear railroad wheel assembly 36. Railroad wheel assemblies 36 are commercially available under model numbers RW1630-RU from Diversified Metal Fabricators, Inc., with offices in Atlanta, Georgia.

A second power take-off mechanism 94 is connected to the transmission 92 of the vehicle engine 90. The second power take-off mechanism 94 is similarly operable such as by a lever within the cab of the vehicle 34. The second power take-off mechanism 94 is connected to and energizes a second hydraulic pump 98 for circulating hydraulic fluid or liquid to energize the air blowers 52 and the liquid pesticide conveying and dispensing system.

The second hydraulic pump 98 supplies hydraulic fluid or liquid from one or more reservoirs 114, 116 through lines to a first hydraulic motor 120, a second hydraulic motor 122 and a third hydraulic motor 124. The first hydraulic motor 120 is connected to and energizes a hydraulic pump 126 in the liquid pesticide conveying and dispensing system. The second hydraulic motor 122 is connected to and energizes one of the air blowers 52. The third hydraulic motor 124 is connected to and energizes the other one of the air blowers 52. A solenoid valve 128 is in the line 118 which is operable to turn the first motor 120 on and off. A solenoid valve 130 is in the line 118 which is operable to turn the second and third motors 122 and 124 on and off. A pressure relief valve 131 can be located in the system for returning the fluid to the reservoir(s) 114, 116 and bypassing the first, second and third motors 120, 122, and 124. Means can be included in the hydraulic system for filtering and/or cooling, such as by a radiator 132, the fluid.

Figure 11:
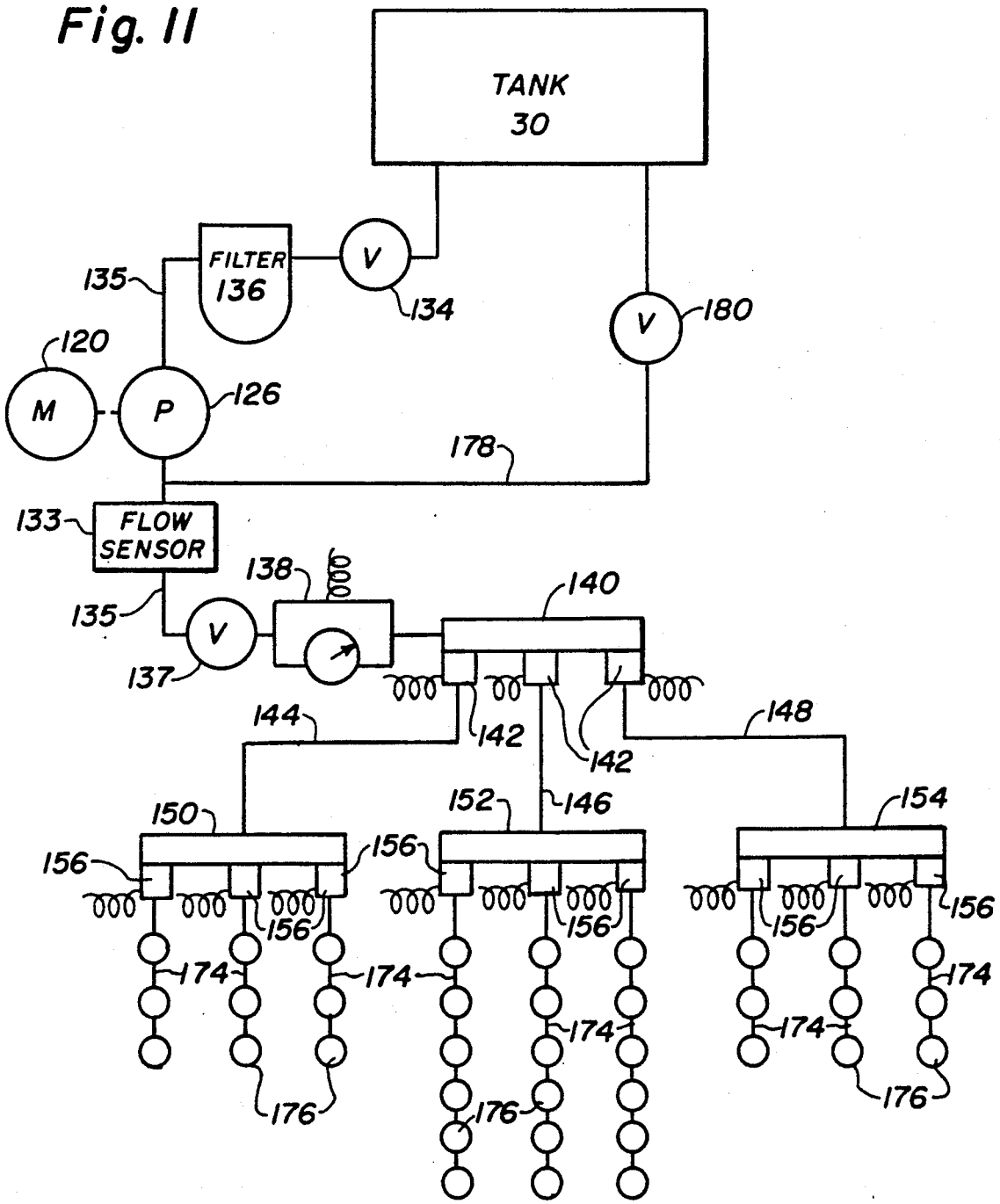
FIG. 11 is a schematic representation of the applying system's liquid herbicide conveying and dispensing system.

FIG. 11 is a schematic representation of the applying system's liquid conveying and dispensing system. Liquid is stored in the tank 30. The hydraulic pump 126 pumps the liquid from the tank 30 through a line 135 to a manifold 140. A manual on/off valve 134 and/or a filter 136 and/or a pressure regulator 138 may be in the line 135. Further, a flow meter or sensor 133 and an adjustable valve 137 are in the line and electrically connected to a flow control unit positioned in the cab of the vehicle. The flow control unit is chosen to enable the vehicle driver or passenger to control the volume of liquid flow through the valve 137 as a function of the vehicle speed. One commercially acceptable unit for this purpose is sold by Raven Industries, Inc., with offices at Sioux Falls, South Dakota under model number SCS440. The manifold 140 has a plurality of outlets, each of the outlets for providing the liquid to a different array of nozzles 176 for spraying the liquid onto the plurality of substantially different regions. One end of a line is connected to each of the outlets of the manifold 140. In a preferred embodiment, the manifold 140 has three lines 144, 146 and 148. A solenoid valve 142 is in each of the lines 144, 146 and 148 and is operable to turn liquid flow on or off in the lines 144, 146 and 148. The other end of the lines 144, 146 and 148 are connected to other manifolds 150, 152 and 154, respectively. Each of these other manifolds 150, 152 and 154 have a plurality of outlets connected to lines 174. Each of the lines 174 similarly has a solenoid valve 156 in it which is operable to turn liquid flow on or off in the respective line 174. One or more nozzle 176, e.g., 3, 5 or 6, is positioned in each of the lines 174 downstream of the solenoid valves 156. A return line 178 can be connected to the tank 30 and the line 135 between the pump 126 and the manifold 140. A pressure relief valve 180 can be in the return line 178 such that when the pressure in the manifold 140 increases to a predetermined value, such as by the closing of one or more of the solenoid valves 142 and/or 156, excess liquid passes through the valve 180 back to the tank 30.

Each of the arrays of nozzles 176 can be located on a different area of the vehicle 34. For instance, referring to FIG. 1, one of the arrays of the nozzles 176, such as the array supplied by the line 146, can be attached to a multi-positionable boom on the front of the vehicle 34 to spray the liquid generally on regions in front of the vehicle 34 covering the zones designated 6, 7 and 8 in FIG. 2. Another one of the liquid nozzle arrays, such as the array supplied by the line 144, can be positioned on the passenger side of the vehicle with its nozzles 176 positionable to spray the liquid generally in regions covering the zones designated 9 and 10 in FIG. 2. Another one of the liquid nozzle arrays, such as the array supplied by the line 148, can be positioned on the driver side of the vehicle with its nozzles 176 positionable to spray the liquid generally in regions covering the zones designated 4 and 5 in FIG. 2.

Figure 12:
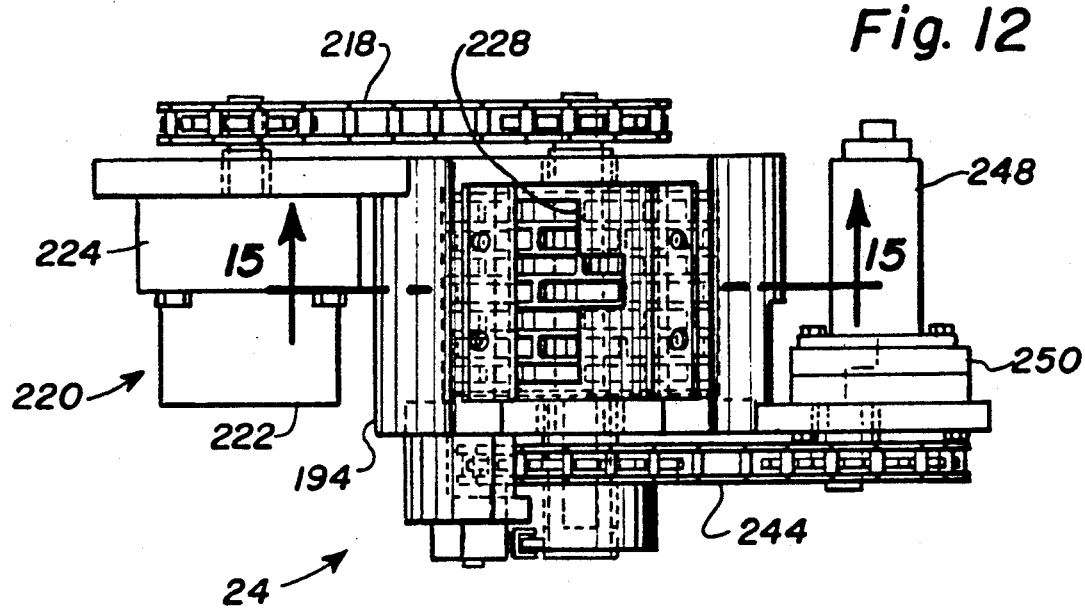
FIG. 12 is a top plan view of a metering device in accordance with the present invention.
Figure 13:
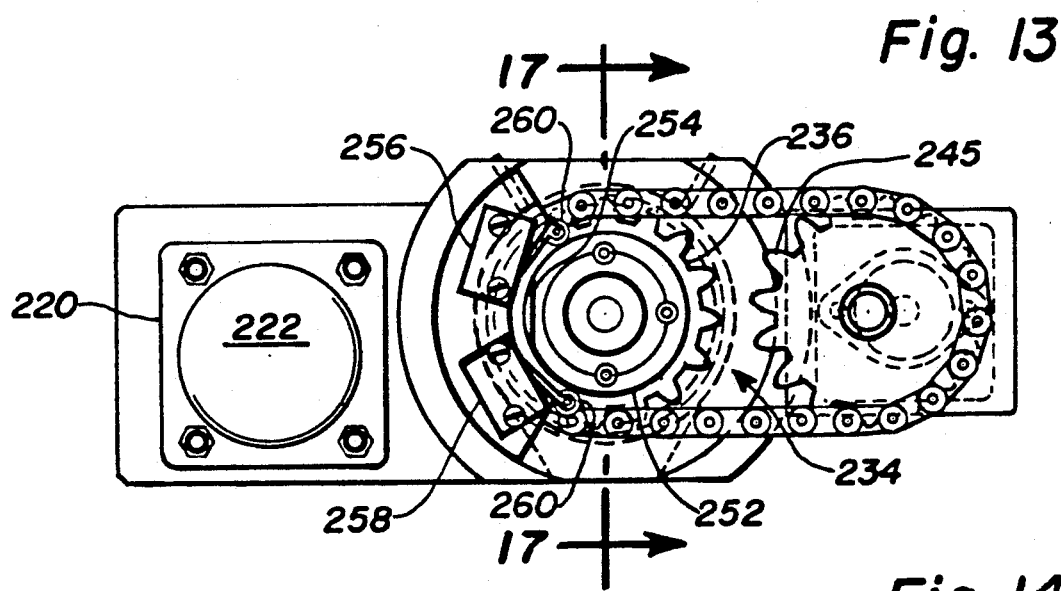
FIG. 13 is a front side elevation of the metering device of FIG. 12.
Figure 14:
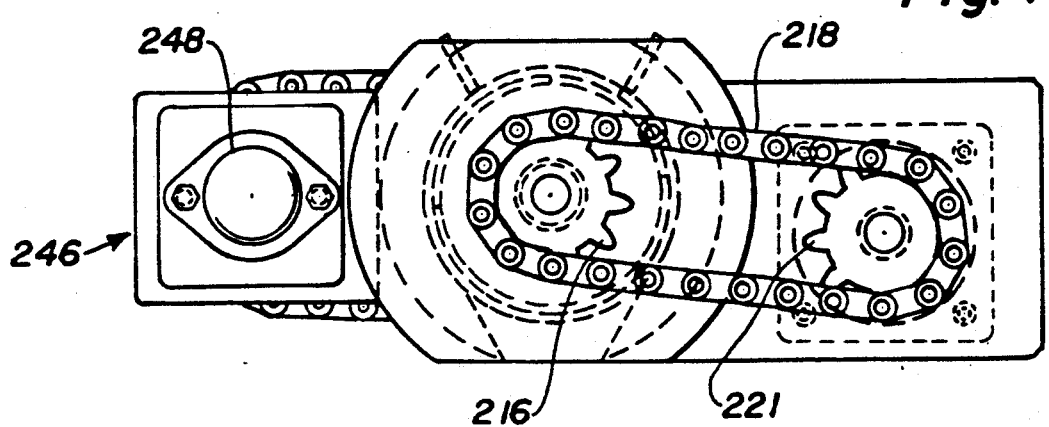
FIG. 14 is a back side elevation of the metering device of FIG. 12.
Figure 15:
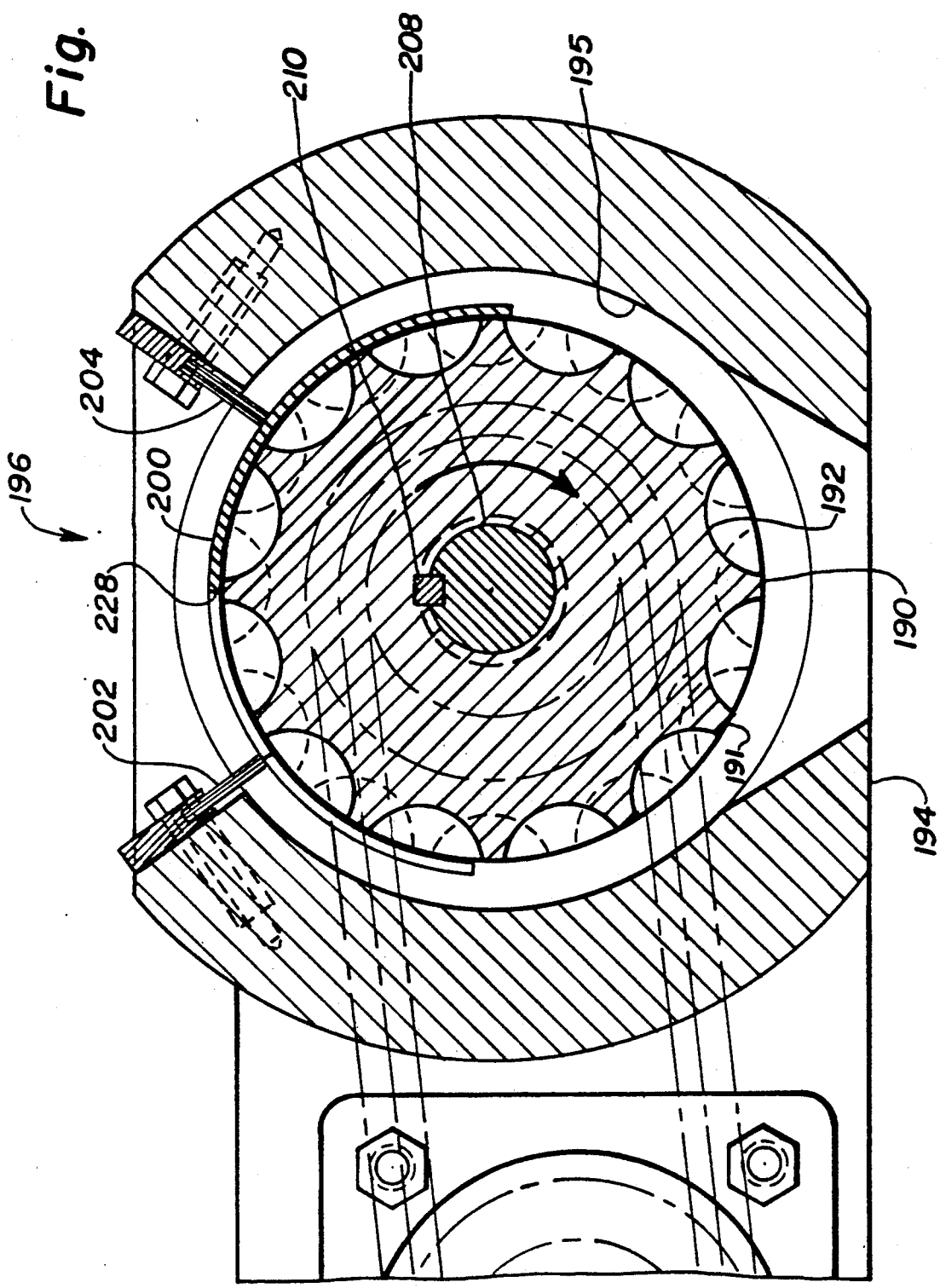
FIG. 15 is an enlarged sectional view taken on the line 15—15 of FIG. 12 showing the relationship of parts of the metering device including a rotor, a housing, a gate and wiping mechanisms.
Figure 16:
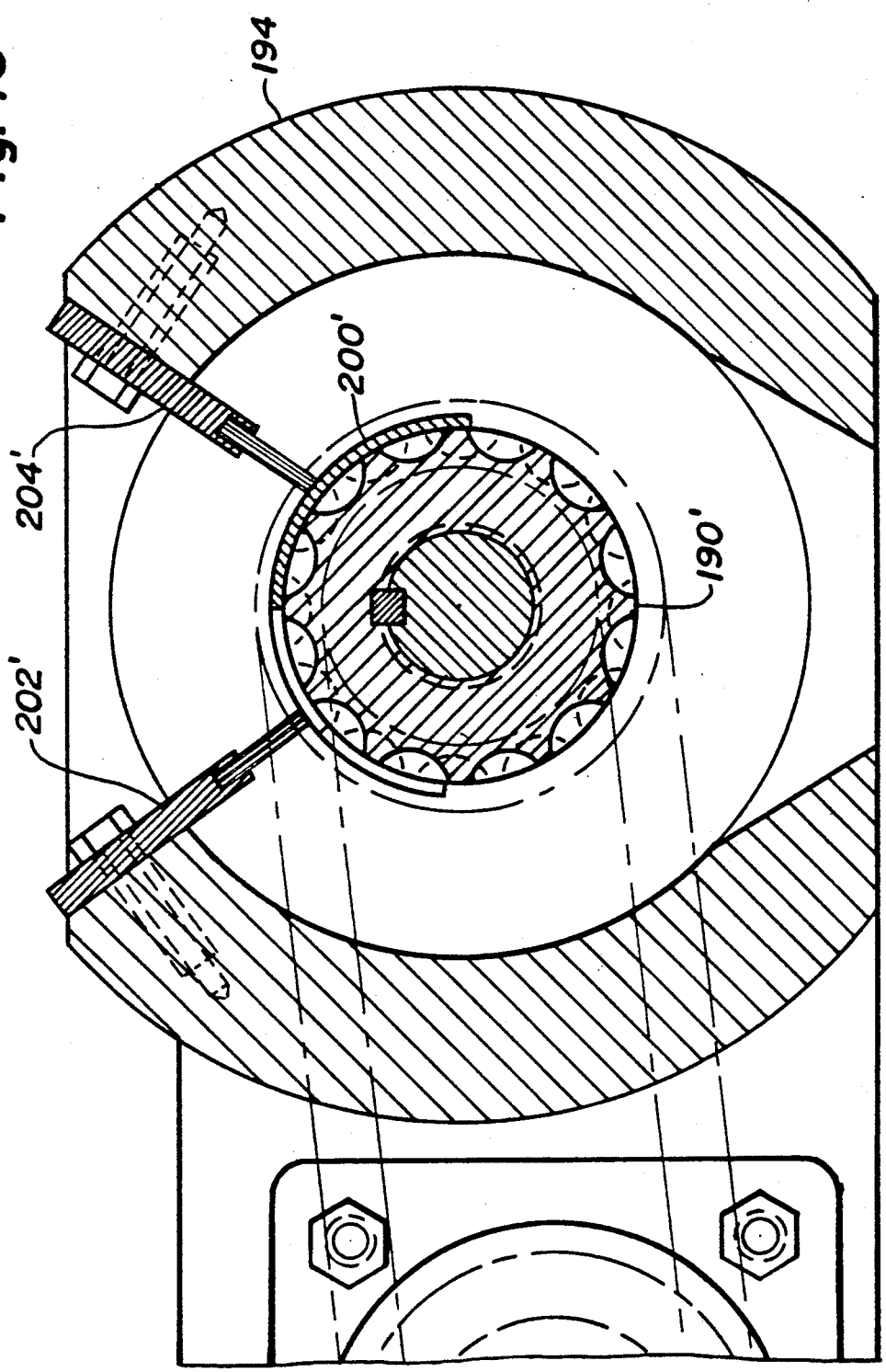
FIG. 16 is a view like FIG. 15 showing a metering device of the present invention having a smaller rotor.
Figure 17:
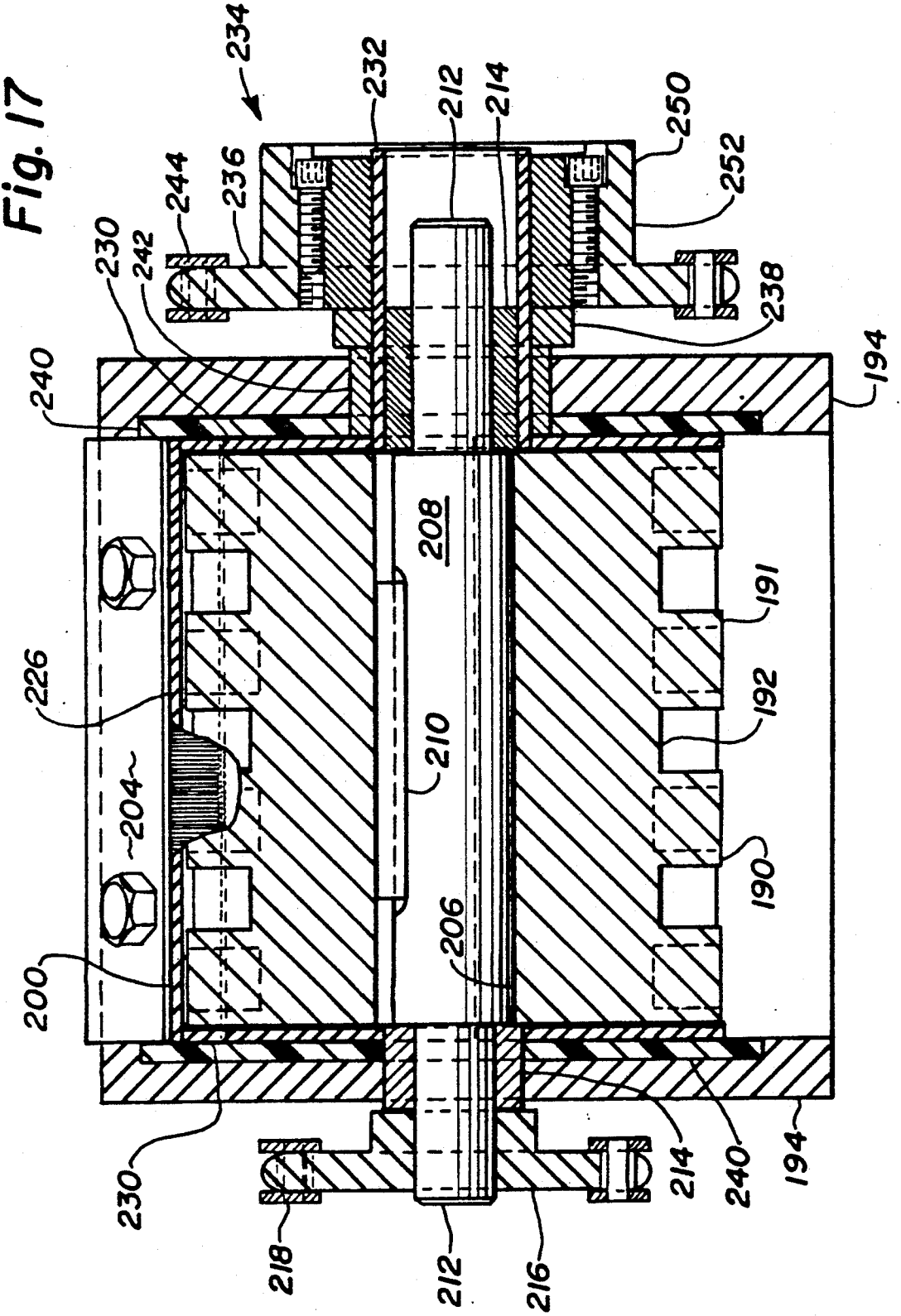
FIG. 17 is a sectional view taken on the line 17—17 of FIG. 13 which shows drive connections of the gate and the rotor.

FIG. 12 is a top plan view of a metering device or apparatus 24 in accordance with the present invention. FIG. 13 is a front side elevation of the metering device 24 of FIG. 12. FIG. 14 is a back side elevation of the metering device 24 of FIG. 12. FIG. 15 is an enlarged sectional view taken on the line 15—15 of FIG. 12 showing the relationship of parts of the metering device including a rotor, a housing, a gate and wiping mechanisms. FIG. 16 is a view like FIG. 15 showing a metering device of the present invention having a smaller rotor. FIG. 17 is a sectional view taken on the line 17—17 of FIG. 13 which shows drive connections of the gate and the rotor.

Referring to FIGS. 12, 15 and 17, the metering device 24 includes a rotor 190, a housing 194, a gate 200 and a blocking mechanism 202, 204.

The rotor 190 has an axis of rotation and an outer circumferential surface 191 having indentations 192 arranged in the surface 191 in circumferential rows with each of the rows offset with respect to adjacent rows such that any radial plane including the rotor axis contains a substantially constant cross section of the indentations 192. Each of the indentations 192 has a volume in a range of about 35 through about 350 cubic millimeters. In one embodiment, the indentations 192 are cylindrical about axes that are parallel to the rotor axis. Each of the cylindrical indentations 192 is preferably configured to comprise less than half of a cylinder. Preferably, each of the cylindrical indentations 192 is defined by a plane intersecting a cylinder. Preferably, the cylinder's diameter D is about 3 or 4 times its length L. Further, the plane preferably contains a line about one quarter of the cylinder's diameter away from the cylinder's longitudinal axis and is parallel to the cylinder's longitudinal axis. Preferably, the segments formed by the intersection of the plane and the cylindrical surface of the cylinder are equally spaced from the cylinder's longitudinal axis.

The rotor 190 can have a central passage 206 through which extends a shaft 208 about which the rotor 190 is adapted to rotate. A rectangular block 210 can be positioned in mating grooves in the passage 206 and the shaft 208 to prevent rotation between the passage 206 and the shaft 208. Alternatively, the rotor 190 can be integral with or connected to the shaft 208 in any fashion. End portions 212 of the shaft 208 can be reduced in diameter with respect to the central portion of the shaft 208. The shaft end portions 212 can be rotatably mounted in cylindrical bushings or bearings 214.

The housing 194 can be mounted to the hopper 22. The housing is configured to partially enclose and rotatably support the rotor 190. The housing 194 can have a cylindrical inner surface 195 defining a space for the rotor 190. The cylindrical inner surface 195 is configured such that it is spaced with respect to the rotor outer circumferential surface 191. The housing 194 has a first opening 196 and a second opening 198. Each of the openings 196, 198 provides access to the rotor surface 191 and the openings 196, 198 are spaced from one another. Preferably, the openings 196, 198 align in a straight line through the housing 194. One end of the housing 194 is rotatably connected to one of the cylindrical bushings 214. Another end of the housing 194 rotatably supports the other cylindrical bushing 214.

Referring to FIGS. 12, 14 and 17, a rotor motor gear 216 is connected to one of the shaft end portions 212. A chain 218 connects the rotor motor gear 216 to a gear 221 of a rotor motor assembly 220 including a motor 222 and optionally a speed reducer gearbox 224.

Referring again to FIGS. 12, 15 and 17, the gate 200 has a cylindrical surface 226 selectively positionable between the housing 194 and the rotor 190 to control the size of the first housing opening 196. In other words, the gate 200 selectively controls the surface area of the rotor 190 exposed to receive material from the first housing opening 196. The surface 226 has a stepped edge 228 which is configured such that when the gate 200 is in a first fully opened position with respect to the housing 194 as illustrated in FIG. 12, granular material can enter through the first opening 196 into all of the circumferential rows of the indentations 192. FIG. 12 shows 7 such rows. When the gate 200 is in a second partially closed position with respect to the housing 194, granular material can enter through the first opening 196 into less than all, e.g., 2, of the circumferential rows of the indentations 192. Sides 230 of the gate 200 are rotatably mounted on the bushings 214. A cylindrical portion 232 extends from one of the sides of the gate 200 and is connected to a gate motor gear assembly 234 such that when a gear 236 of the gear assembly 234 rotates about the shaft 208, the gate 200 rotates about the shaft 208. The gate motor gear assembly 234 has an extension 250 which has an outer surface 252 that is cylindrical, except for one flat portion 254.

One of the ends of the housing 194 is connected to another bushing 242 which rotatably supports the cylindrical portion 232. A washer or spacer 238 can be positioned around the cylindrical portion 232 between the bushing 214 and the gate motor gear assembly 234. A polymer housing lining 240 can be located between the gate sides 230 and the housing 194.

Referring to FIGS. 12, 13 and 17, a chain 244 connects the gate motor gear 236 to a gear 245 of a gate motor assembly 246 including a motor 248 and optionally a speed reducer gearbox 250.

A first switch mechanism 256 and a second switch mechanism 258 are connected to the housing 194. Each of the mechanisms 256 and 258 has a pivotable arm 260 biased towards and in contact with the outer surface 252. Illustrative switch mechanisms are available from Newark Electronics with offices at Chicago, Illinois, under stock number E23-00k. Referring to FIG. 13, when the gear assembly 234 rotates clockwise, the arm 260 of the switch mechanism 256 will pivot towards the gear assembly 234 when the arm 260 of the switch mechanism 256 comes in contact with the flat portion 254. This opens a circuit stopping the gate motor assembly 246 with the gate 200 in its first fully opened position. When the gear assembly 234 rotates counter clockwise, the arm 260 of the switch mechanism 256 will pivot towards the gear assembly 234 when the arm 260 of the switch mechanism 258 comes in contact with the flat portion 254. This opens a circuit stopping the gate motor assembly 246 with the gate 200 in its second partially opened position.

Referring to FIGS. 15 and 17, the blocking mechanism 202, 204 preferably comprises a first wiping mechanism 202 and a second wiping mechanism 204. The first and second wiping mechanisms 202, 204 can be identical. They are connected to the housing 194 between the housing 194 and adjacent the rotor outer cylindrical surface 191 to prevent excess material from entering the first housing opening 196. They are positioned across from one another in the first housing opening 196. Each of the wiping mechanisms 202, 204 can generally lie in a radial plane containing the rotor axis of rotation. The wiping mechanisms 202, 204 can be brushes or wiper blades for brushing or wiping the rotor outer cylindrical surface 191 while the rotor 190 is rotating in the housing 194. The wiping mechanisms 202, 204 only allow granular material in the indentations 192 to pass into the opening 196 through the metering device 24 and out the second opening 198. The wiping mechanisms can be separate parts from the housing 194 as illustrated in the drawings. However, it is to be understood that the wiping mechanisms could be part of the housing 194.

In operation when the material is fed by gravity into the first housing opening 196, the rotor 190 is rotated with respect to the gate 200 and the housing 194, and the gate 200 is positioned to open the first housing opening 196, then the material is metered through the apparatus and out the second housing opening 198 substantially.

Referring to FIG. 16, there is illustrated another embodiment of the metering device 24' of the present invention. The device 24' is the same as the one depicted in FIG. 15, except the rotor 190' has a smaller diameter, the gate 200' is correspondingly smaller and the wiping mechanisms 202' and 204' are longer. Assuming the rotors are rotating at the same number of revolutions per minute, the metering device 24' illustrated in FIG. 16 meters less granular material per unit time than the metering device 24 of FIG. 15. Thus, any number of different metering devices 24, 24' can be used on the system 20 enabling different flow rates for different granular materials or different flow rates of the same material for different zones.

Figure 18:
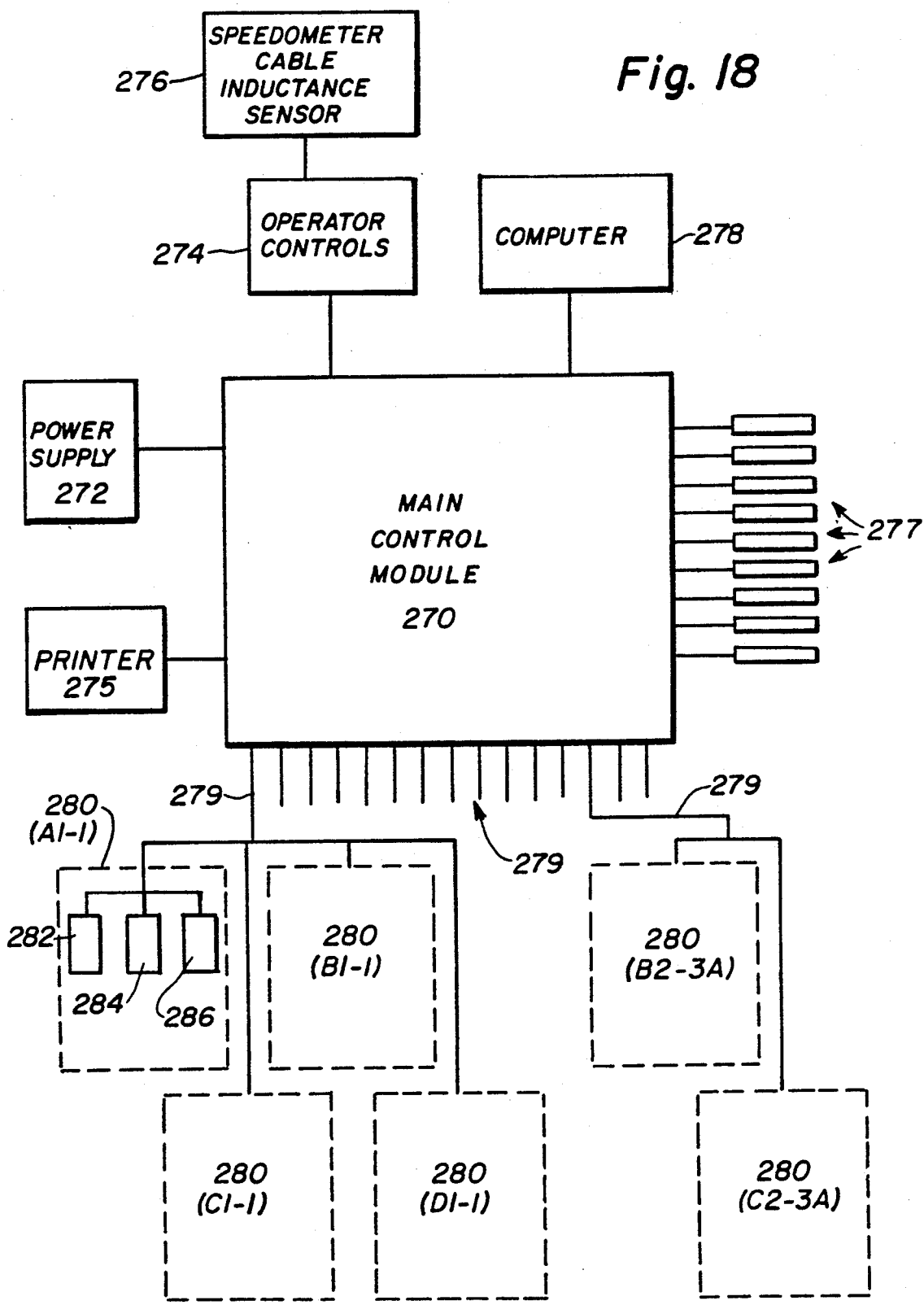
FIG. 18 is an electrical block diagram for the conveying and dispensing system.

FIG. 18 is an electrical block diagram for the applying system 20. A main control module 270 is connected to receive power from a power supply 272. Operator controls 274 are located in the cab of the vehicle 34 and are connected to provide signals to the main control module 270. A speedometer cable inductance sensor 276 is connected to provide electrical signals representative of the speed of the vehicle 34 through the operator controls 274 to the main control module 270 or directly to the main control module 270. A computer 278, such as a laptop computer, and/or a printer 275 can be located in the cab of the vehicle 34 connected to the main control module 270 to interact with the main control module 270.

The main control module 270 can be connected by separate lines to parts of liquid pesticide solenoid circuits 277, one solenoid circuit 277 for controlling each of the solenoid valves 156, more specifically, for turning the liquid pesticide flow on and off through the nozzles 174.

Further, the main control module 270 is designed to control the metering devices 24, 24'. This is accomplished by connecting the main control module 270 to at least one meter device control assembly 280. Preferably, one cable 279 connects the main control module 270 to a meter device control assembly 280 for o each meter device 24, 24' supplying one of the zones. For instance, for the embodiment illustrated in FIG. 6, one of the cables 279 connects the main control module 270 to four meter device control assemblies 280, a first meter control assembly 280 (A1—1) for controlling the meter device 24 connected to the compartment A1 for conveying material to zone 1, a second meter control assembly 280 (B1—1) for controlling the meter device 24 connected to the compartment B1 for conveying material to zone 1, a third meter control assembly 280 (C1—1) for controlling the meter device 24 connected to the compartment C1 for conveying material to zone 1, and a fourth meter control assembly 280 (D1—1) for controlling the meter device 24 connected to the compartment D1 for conveying material to zone 1. A separate one of the cables 279 can be used to connect the main control module 270 to a meter control assembly 280 (B2-3A) for controlling the meter device 24 connected to the compartment B2 for conveying material from its second outlet 40 to zone 3 and to a meter control assembly 280 (C2-3A) for controlling the meter device 24 connected to the compartment C2 for conveying material from its second outlet 40 to zone 3. Similarly, a separate one of the cables 279 can be used to connect the main control module 270 to a meter control assembly 280 (B2-11A) for controlling the meter device 24 connected to the compartment B2 for conveying material from its second outlet 40 to zone 11 and to a meter control assembly 280 (C2-11A) for controlling the meter device 24 connected to the compartment C2 for conveying material from its second outlet 40 to zone 11.

Each one of the meter control assemblies 280 includes part of a rotor motor control circuit 282, part of a gate motor control circuit 284 and part of a flow sensor control circuit 286. The other parts of the rotor motor control circuits 282, the gate motor control circuits 284, the flow sensor control circuits 286 and the liquid herbicide solenoid circuits 277 are in the main control module 270 and the operator controls 274.

Figure 19:
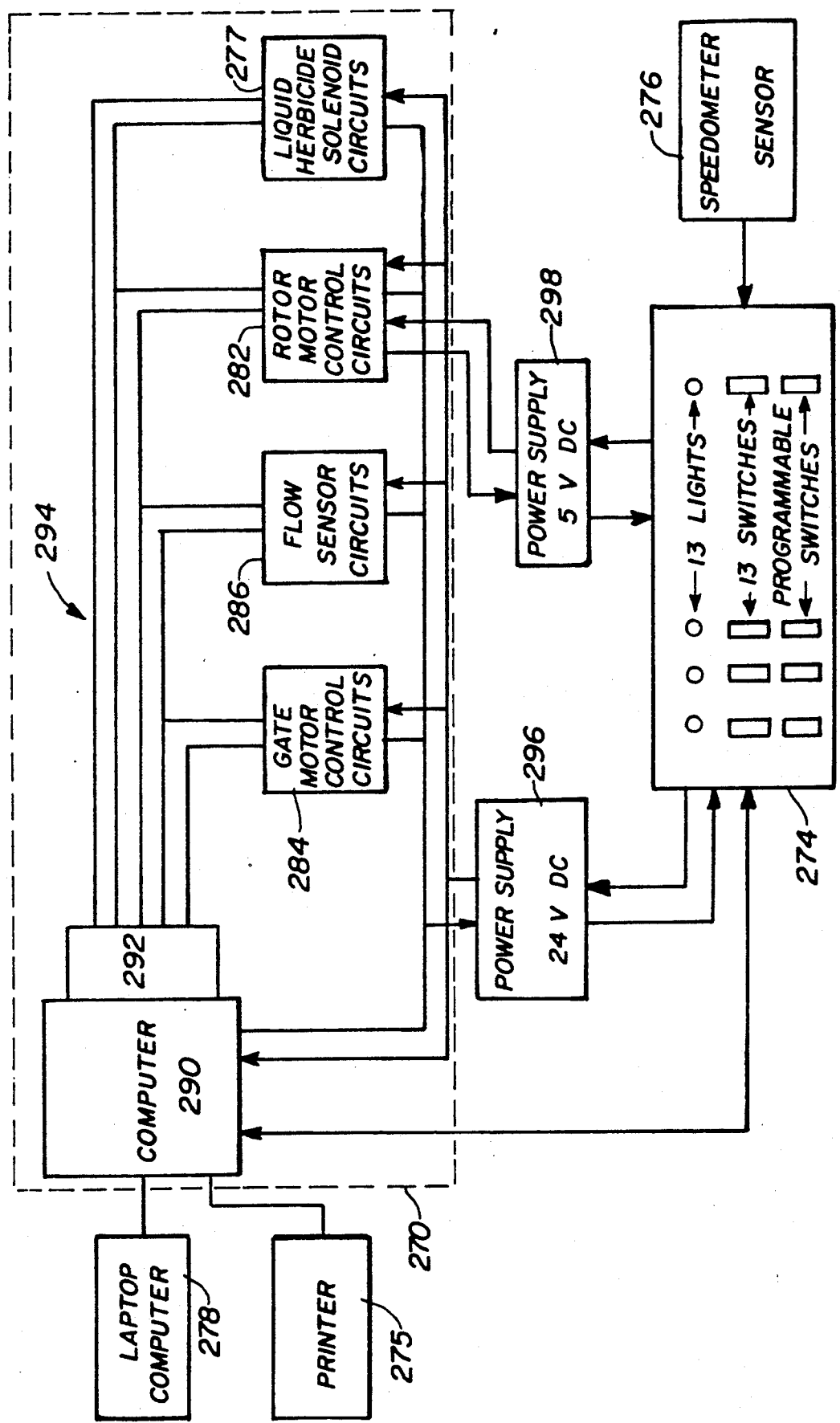
FIG. 19 is another electrical block diagram of the main control module and operator controls of FIG. 18.

FIG. 19 is another electrical block diagram of the main control module 270 and the operator controls 274 of FIG. 18. The main control module 270 includes a computer 290 interactively connected through an interface unit 292 by lines 294 to the gate motor control circuits 284, the flow sensor control circuits 286, the rotor motor control circuits 282 and the liquid pesticide solenoid circuits 277. The computer can be any device that performs the functions described herein, such as part number LC4DC, from Opto 22 located at Huntington Beach, California. A suitable interface is an Ex 1 Daughter Board also available from Opto 22. The laptop computer 278, the printer 275 and the operator controls 274 are interactively connected to the computer 290. The power supply 272 comprises a 24 volt DC power supply 296 and a 5 volt DC power supply 298. The 24 volt DC power supply 296 is connected to supply power to the computer 290, the gate motor control circuits 284, the flow sensor control circuits 286, the rotor motor control circuits 282, the liquid pesticide solenoid circuits 277 and the operator controls 274. The 5 volt DC power supply 298 is connected to supply power to the rotor motor control circuits 282 and the operator controls 274.

Figure 20:
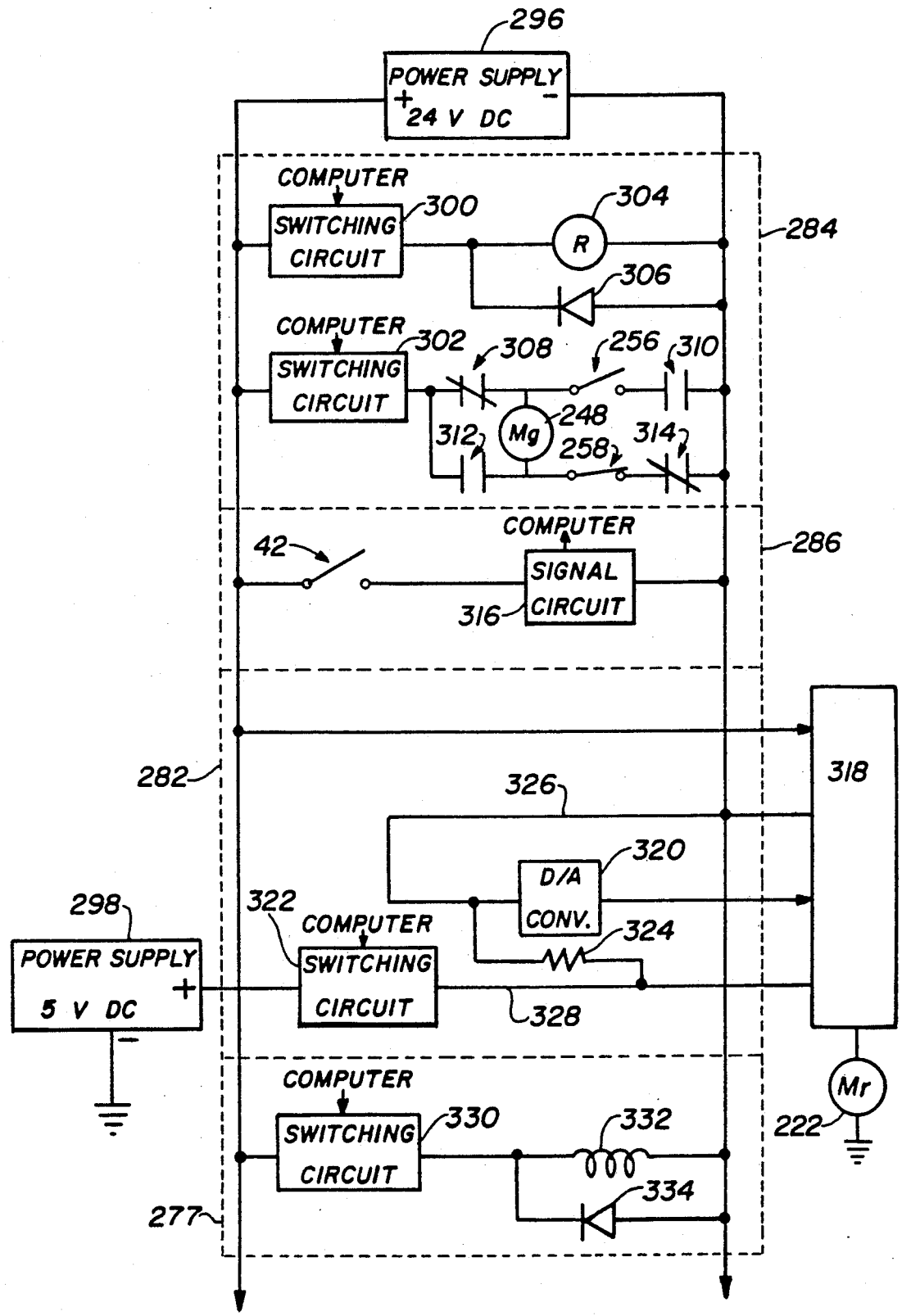
FIG. 20 illustrates detailed preferred embodiments of gate motor control circuits, flow sensor circuits, rotor motor control circuits, and liquid herbicide solenoid circuits of FIG. 19.

FIG. 20 illustrates detailed preferred embodiments of the gate motor control circuits 284, the flow sensor circuits 286, the rotor motor control circuits 282, and the liquid pesticide solenoid circuits 277 of FIG. 19.

Each one of the gate motor control circuits 284 can comprise a first switching circuit 300 and a second switching circuit 302 connected in parallel to the 24 volt power supply 296. The first switching circuit 300 is connected in series with a relay 304. A diode 306 is connected in parallel with the relay 304. The second switching circuit 302 is connected in series with a first relay switch 308, the first switch mechanism 256, and a second relay switch 310. A third relay switch 312, the second switch mechanism 258 and a fourth relay switch 314 are connected in parallel with the first relay switch 308, the first switch mechanism 256, and the second relay switch 310. One lead from the gate motor 248 is connected between the first relay switch 308 and the first switch mechanism 256. The other lead from the gate motor 248 is connected between the third relay switch 312 and the second switch mechanism 258.

In operation, when the first switching circuit 300 receives a signal from the computer 290, the first switching circuit 300 activates the relay 304 into closing, for instance, the first and fourth relay switches 308, 314 and opening the second and third relay switches 310, 312 making the current flow one direction through the gate motor 248. When the first switching circuit 300 receives another signal from the computer 290, the first switching circuit 300 causes the relay 304 to close, for instance, the second and third relay switches 310, 312 and to open the first and fourth relay switches 308, 314 making the current flow the opposite direction through the gate motor 248. When the second switching circuit 302 receives a signal from the computer 290, the second switching circuit 302 activates the gate motor 248. When the second switching circuit 302 receives another signal from the computer 290, the second switching circuit 302 deactivates the gate motor 248.

Each one of the flow sensor control circuits 286 can comprise one of the flow sensors 42 and a first signal circuit 316 connected in series with the 24 volt power supply 296. The signal circuit 316 is designed such that when material flow is sensed by the flow sensor 42, the signal circuit 316 sends a signal to the computer 290.

Each one of the rotor motor control circuits 282 can include a motor controller 318 having a plurality of terminals, such as model number BLS540GK24L from Oriental Motor with offices at Torrance, California.

The purpose of the motor controller is to control the rpms of the respective motor. A first one of the motor controller terminals is connected to the positive terminal of the 24 volt power supply 296. A second one of the motor controller terminals is connected to the negative terminal of the 24 volt power supply 296. A digital to analog converter 320 is connected between the negative terminal of the 24 volt power supply 296 and a third terminal of the motor controller 318. A fourth terminal of the motor controller 318 is connected to a third switching circuit 322 which in turn is connected to the 5 volt power supply 298. A resistor 324 is connected between a line 326 connecting the negative terminal of the 24 volt power supply 296 to the digital to analog converter 320 and a line 328 connecting the fourth terminal of the motor controller 318 to the third switching circuit 322. One of the leads of the rotor motor 222 is connected to a fifth terminal of the motor controller 318. The other lead of the rotor motor 222 is connected to ground.

In operation, the third switching circuit 322 receives signals from the computer 290 that are proportional to the speed of the vehicle 34. Since the motor controller 318 is connected to the third switching circuit 322, the speed of the rotor motor 222 is proportional to the speed of the vehicle 34.

Each of the liquid pesticide solenoid circuits 277 can comprise a fourth switching circuit 330 and a coil 332 of one of the liquid pesticide solenoids connected in series with the 24 volt power supply. A diode 334 can be connected in parallel with the coil 332. In operation, when the fourth switching circuit 330 receives a signal from the computer 290, it activates the coil 332 to either open or close the solenoid valve 156.

Figure 21:
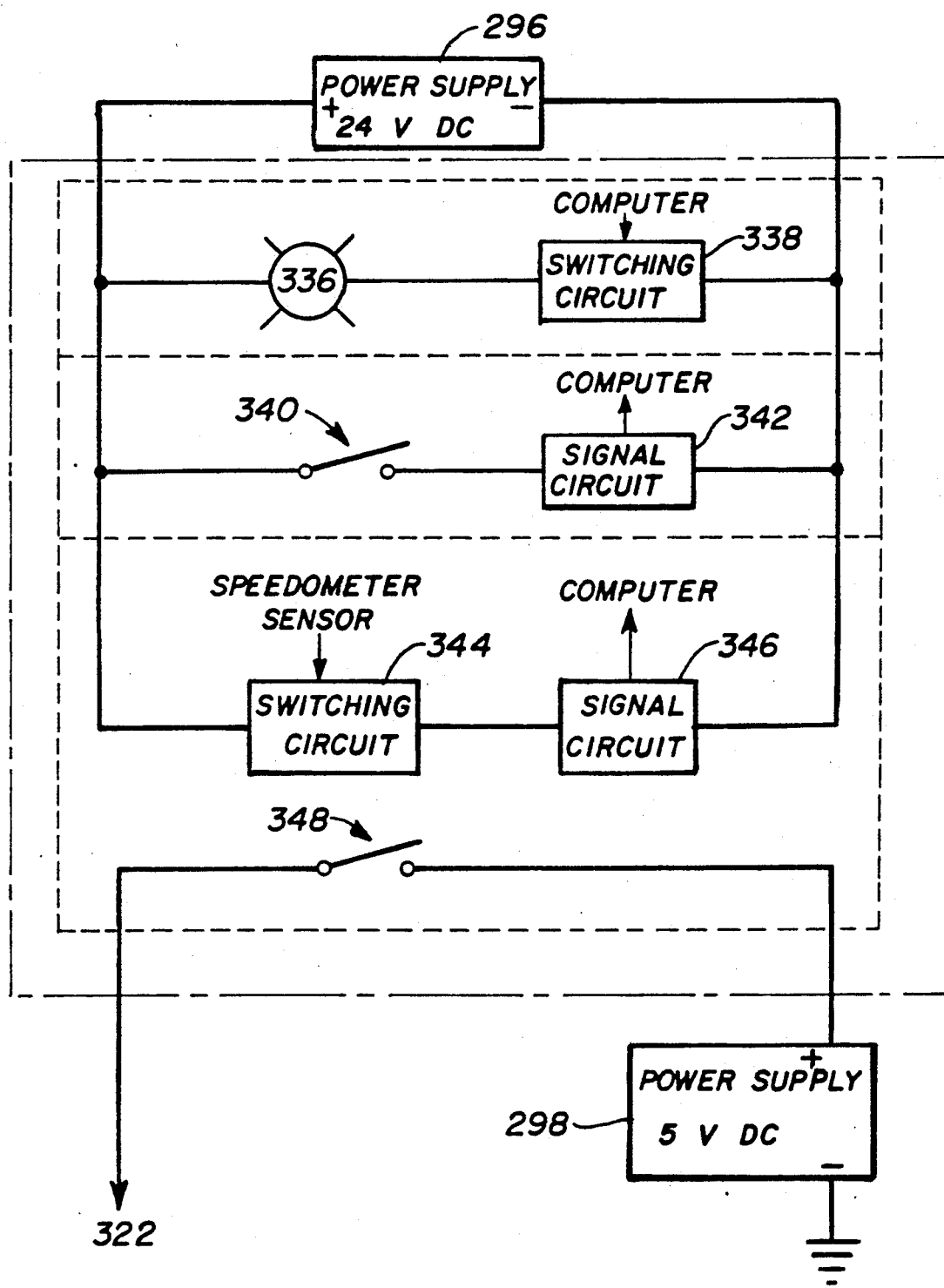
FIG. 21 illustrates a detailed preferred embodiment of the operator controls.

FIG. 21 illustrates a detailed preferred embodiment of the operator controls 274. For each one of the granular material nozzles $N_1$-$N_{13}$, the operator controls 274 includes a light source 336 and a fifth switching circuit 338 connected in series with the 24 volt power supply 296. When the flow sensors 42 sense material flow in the material flow paths supplying material to one of the nozzles, e.g., $N_1$, the first signal circuits 316 send signals to the computer 290 which sends a signal to the fifth switching circuit 338 which turns on the corresponding light source 336.

For each one of the granular material nozzles $N_1$-$N_{13}$, the operator controls 274 includes a manual switch 340 and a second signal circuit 342 connected in series with the 24 volt power supply 296. When one of the switches 340 is closed such as the switch 340 corresponding to nozzle $N_1$, the corresponding second signal circuit 342 sends a signal to the computer 290 which sends signals to activate the third switching circuits 322 for energizing the metering devices 24 in the material flow paths that supply material to the nozzle $N_1$. The operator controls 274 may also include programmable switches which operate like the manual switches 340, but one of the programmable switches can be programmed to turn on and off material flow to a plurality of the zones.

The operator controls 274 may house a sixth switching circuit 344 and a third signal circuit 346 connected in series with the 24 volt power supply 296. Alternatively, this circuit can be housed elsewhere, such as in the main control module 270. The speedometer sensor 276 is connected to the sixth switching circuit 344 and provides signals proportional to the speed of the vehicle 34 through the fifth switching circuit 344 and the third signal circuit 346 to the computer 290. The computer 290 adjusts its signals to the third switching circuits 322 to be proportional to the signal the computer 290 receives from the third signal circuit 346. This controls the speed of the rotor motors 222 based on the speed of the vehicle 34.

The operator controls 274 further include switches 348 for activating the solenoid valves 156 turning on and off the flow of liquid pesticide and switches for controlling solenoid valves 74, 128, 130 and 142. The switches and circuits for controlling the solenoid valves 74, 128, 130 and 142 can be similar to solenoid valves 74, 128, 130 and 142 that described above in relation to the switches 340. Alternatively, the switches for turning the solenoid valves 74, 128 and 130 on and off can be simply in series with a power source, such as the 24 volt power source, and the coil of the respective solenoid. In other words, these circuits do not have to go through the computer 290. Further, the solenoid valves 142 can be electrically connected to the (Raven) flow control unit referred to in reference to FIG. 11.

The switching circuits 300, 302, 322, 330, 338, and 344 can be any circuit(s) as long as it or they perform the functions described above. One such switching circuit is available under model number ODC5Q or OCD5 from Opto 22 located at Huntington Beach, California. Similarly, the signal circuits 316, 342 and 346 can be any circuit(s) as long as it or they perform the functions described above. One such signal circuit is available under model number IDC5Q or IDC5 from Opto 22.

In operation, the above described material applying portion of the system 20 performs a method of applying at least one granular material onto a plurality of substantially different zones, comprising the steps of: metering the material(s) from outlets of compartments of a hopper to sections of a collection trough; and conveying and dispensing the materials from outlets of the collection trough through points of release onto the plurality of substantially different zones, such that the material(s) are applied to the zones substantially without pulsing or attrition. Preferably, larger or heavier granules of the material(s) are applied to the zones farther from the points of release, i.e., the outlet ends of the nozzles, than granules applied to the zones closer to the points of release.

The present invention can be implemented in a variety of hardware and software configurations as will be apparent to those skilled in the art. An illustrative software embodiment for operating the aforesaid system 20 is included in an Appendix to this specification. The software program is written in the Forth language and appears immediately before the claims.

The aforedescribed system 20 allows for substantially uniform and simultaneous application of 12 or more different materials in dry granular form at a wide variety of low application rates including less than 10 pounds per acre (11.2 Kg/ha) to as low as about one ounce per acre (70 gr/ha). The system 20 can apply any material, including pesticides, that fits in the indentations 192 of the rotors 190. Furthermore, the granular material applying portion of the system is boomless and covers swaths of ground up to about 100 feet (30.48 meters) wide. The material being applied to each zone is independently controllable. More specifically, the metering means 24 are individually controllable for each of the zones, such that the system 20 is adapted to simultaneously apply different rates or amounts of the material(s) per unit area to different zones. The metering means 24 are adapted to meter at rates as low as about 2 grams per minute substantially without pulsing or attrition. The system 20 is operable while the vehicle travels at varying speeds in the range of about 3 through 50 miles (4.8 through 80.5 Km) per hour.

Those skilled in the art, having the benefit of the teachings of the present invention as hereinabove set forth, can effect numerous modifications thereto. These modifications are to be construed as being encompassed within the scope of the present invention as set forth in the appended claims.

APPENDIX

```
: TASK    ." MERGE.4TH   " ;
\         31 OCTOBER 1988       5 PM
\         12 JANUARY 1989    ADDED PRINTER CONTROL WORDS FOR DICONIX
(   ROUTINES TO CLEAR AND INITIALIZE OPTO BOARDS           )
\ : TASK   ."   INIT.4TH   " ; ( EASY FORGET )
PARAMETER-BLOCK OMUX
PARAMETER-BLOCK PMUX
12 CONSTANT LITE.BD
( )

: ':'

58 HOLD                 ( stick a : into text buffer    )

;

: '/'

47 HOLD                 ( stick a / into text buffer    )

;
```

```
( the following word prints the time on the screen in the  )
( HH:MM:SS format                                          )
(                                                          )
(     hours is 3rd on the stack                            )
(     minutes is 2nd on the stack                          )
(     seconds is 1st on the stack                          )

: .TIME

SWAP ROT                    ( get into correct order   )
     0 <# ':' # # #>            ( convert hours            )
       TYPE                     ( type hours               )
     0 <# ':' # # #>            ( convert minutes          )
       TYPE                     ( type minutes             )
     0 <# # # #>                ( convert seconds          )
       TYPE                     ( type seconds             )
;

( ************* I/O ERROR CHECKING ROUTINES *************** )
: ERRCHK
    ERRORS @ DUP 0<
    IF
        ." \ ****************************************** " CR
        ." \ I/O TRANSMISSION ERROR # "   . CR
        ." \           BOARD ADDRESS # "  ADDRESS @ . CR
        ." \ TIME   " TIME@ .TIME CR
        ." \ ****************************************** " CR
    ELSE
        DROP
    THEN
;

( ****************** CONFIGURE OPTOMUX BOARDS ************** )
( THIS WORD CONFIGURES THE WHOLE BOARD AS OUTPUTS )
: OLITES
    16 0 DO
        I I POSITIONS !
    LOOP
;
( OPTOMUX POWER-UP-CLEAR )
: OPUC
    OMUX PARAMETERS !
    0 COMMAND !
    15 12 DO
        I ADDRESS !
        OPTOWARE ERRCHK
    LOOP
;
( OPTOMUX BOARD RESET )
: ORESET
    OMUX PARAMETERS !
    1 COMMAND !
    15 12 DO
        I ADDRESS !
        OPTOWARE  ERRCHK
```

```
        LOOP
;
( OPTOMUX CONFIGURE DIGITAL OUTPUTS )
: OCONFIGURE
    OMUX PARAMETERS !
    8 COMMAND !
    LITE.BD ADDRESS !
    OLITES
    OPTOWARE ERRCHK
;

( **************** CONFIGURE PAMMUX BOARDS ************** )
( PAMUX POWER-UP-CLEAR )
: PPUC
    ." \ INITIALIZE PAMUX RESET LEVEL " CR
    PMUX PARAMETERS !
    0 ADDRESS !
    2 COMMAND !     ( SET THE RESET LEVEL )
    1 0 INFO !      ( TO HIGH VALUE )
    PAMWARE ERRCHK
    ." \ RESET THE PAMUX BOARDS " CR
    3 COMMAND !     ( NOW RESET THE PAMUX BOARDS )
    44 0 DO
        I ADDRESS !
        PAMWARE ERRCHK
    4 +LOOP
    38 ADDRESS !
    PAMWARE ERRCHK
;

( OUTPUTS FOR BOARDS 0,4,16,20,24 )
: COMMON.BDS
    0 POSITION !    255 0 INFO ! PAMWARE
    1 POSITION !      0 0 INFO ! PAMWARE
    2 POSITION !    255 0 INFO ! PAMWARE
    3 POSITION !      0 0 INFO ! PAMWARE ERRCHK
;
( )

: BDS.80R12
    0 POSITION !    255 0 INFO ! PAMWARE
    1 POSITION !    255 0 INFO ! PAMWARE
    2 POSITION !     15 0 INFO ! PAMWARE
    3 POSITION !      0 0 INFO ! PAMWARE ERRCHK
;
( )
: BD.28
    0 POSITION !    255 0 INFO ! PAMWARE
    1 POSITION !    255 0 INFO ! PAMWARE
    2 POSITION !      0 0 INFO ! PAMWARE
    3 POSITION !    255 0 INFO ! PAMWARE ERRCHK
;
( CONFIGURE THE PAMUX DIGITAL OUTPUTS )
: DIG.CONFIGURE
    PMUX PARAMETERS !
    4 COMMAND !
    ." \ CONFIGURE PAMUX DIGITAL BOARDS "
    32 0 DO
```

```
                    0 ( PUT A FLAG ON THE STACK )
                    I 8  = IF 8 ADDRESS ! BDS.8OR12 DROP 1 THEN
                    I 12 = IF 12 ADDRESS ! BDS.8OR12 DROP 1 THEN
                    I 28 = IF 28 ADDRESS ! BD.28 DROP 1 THEN
                    O= IF I ADDRESS ! COMMON.BDS THEN
            4 +LOOP
;
( CONFIGURE THE PAMUX ANALOG OUTPUTS  )
: ANA.CONFIGURE
    PMUX PARAMETERS !
    ." \ CONFIGURE ANALOG PAMUX BOARDS " CR
    13 COMMAND !
    40 36 DO
          I ADDRESS !
          255 0 INFO !
          0 POSITION ! PAMWARE
          1 POSITION ! PAMWARE ERRCHK
     2 +LOOP
;
( CONFIGURE ALL THE PAMUX OUTPUTS  )
: PCONFIGURE
     DIG.CONFIGURE
     ANA.CONFIGURE
;

( ********** CONFIGURE ALL OF THE SYSTEM OUTPUTS *********** )
: CONFIGURE
     OPUC ORESET OCONFIGURE
     PPUC PCONFIGURE
;
( ************************************.******************** )
( )
( TRUCK.4TH   --   VARIABLES AND   SYSTEM EQUATIONS )
( )
\ : TASK  ."   TRUCK.4TH    "  ;        ( EASY FORGET )
( CONSTANTS )
CREATE 2PWRS 0 , 1 , 2 , 4 , 8 , 16 , 32 , 64 , 128 , 256 ,
             512 , 1024 , 2048 , 4096 , 8192 , 16384 ,
( USE THE INDEX TIMES 2  FOR THE CORRECT POWER )
( THE "," IS NOT A DELIMETER BUT THE CMD TO ALLOT 16B & STORE)

( TRUCK SYSTEM VARIABLES )
VARIABLE DIFF
     0 DIFF !
VARIABLE NEWSTATE
     0 NEWSTATE !
VARIABLE MPHR
     0 MPHR !
VARIABLE MASTERSW
     0 MASTERSW !
VARIABLE AUTOSW
     0 AUTOSW !
VARIABLE CONDSW
     0 CONDSW !

VARIABLE ZONE
     0 ZONE !
```

( VARIABLE ARRAYS -- 2 BYTES = 1 WORD )

```
VARIABLE GATES 114 ALLOT
    : GATE    2* GATES + ;
    GATES 114 0 FILL
VARIABLE RPMS 62 ALLOT
    : RPM     2* RPMS + ;
    RPMS 62 0 FILL
VARIABLE GNEWS 114 ALLOT
    : GNEW    2* GNEWS + ;
    GNEWS 114 0 FILL
VARIABLE STAT 28 ALLOT
    : STATUS  2* STAT + ;
    STAT 28 0 FILL
VARIABLE HGUNS 12 ALLOT
    : HGUN    2* HGUNS + ;
    HGUNS 12 0 FILL
```

( TRUCK SYSTEM EQUATIONS )

```
: NSTATE    AUTOSW @  CONDSW @ OR HGUNS @ OR NEWSTATE !     ;

: MOTORTEST
    CR ." ZONE MOTOR STATUS  "  CR
    14 1 DO
        I STATUS @ . 3 SPACES \ TEST ROUTINE ONLY
    LOOP
        CR                             \ TEST ROUTINE ONLY
;

\ DEFINE THE VARIABLES USED IN THE MOTOR ROUTINE
CREATE ZNORDER   1 , 13 , 12 , 2 ,
                11 ,  3 , 10 , 4 ,
                 9 ,  5 ,  8 , 6 ,
                 7 ,
CREATE BDORDER   8 , 12 , 28 , 28 ,
VARIABLE WET
    0 WET !
VARIABLE TEST
    0 TEST !
PARAMETER-BLOCK MOTORS

: MOTOR
TEST @  0= IF
    MOTORS PARAMETERS !
    10 COMMAND !
    0 POSITION !
    3 0 DO
\   CR ."   PASS " I . \ TEST LINE
    I 2* BDORDER + @ ( DUP . 3 SPACES) ADDRESS !
        0 \ INITIALIZE INFO TO 0
        4 0 DO
            J 8 * ZNORDER + I 2* + @ ( DUP .) STATUS @
            0> IF I 5 + 2* 2PWRS + @ + ( DUP 2 SPACES .)
            THEN
\   3 SPACES   \ TEST LINE
```

```
            LOOP
    \      5 SPACES DUP .   \ TEST LINE
           0 INFO !
           PAMWARE
       LOOP
\    CR  ."  LAST PASS  ZN 7 "
     3 POSITION !
           0  \ INITIALIZE INFO TO 0
           7 ( DUP .) STATUS @
           0> IF 16  + THEN
           WET @ +
\          5 SPACES DUP .
           0 INFO !
           PAMWARE
ELSE MOTORTEST THEN
;

: TURNOFF
\    CR   ."  TURNOFF ROUTINE "  CR
     14 1 DO
           I 2* 2PWRS + @ \ GET THE POWER OF 2
           DIFF @ AND  0> \ TEST EACH ZONE
           IF
\              ." STAT " STAT @ . ." ZNSTAT() " I STATUS @ .
               STAT @ I 2* 2PWRS + @ - STAT ! \ CHG THE STATUS
               0 I STATUS !                   \ 0 THE ZONE STATUS
\              ." NEW STAT " STAT @ .  CR
           THEN
     LOOP
     MOTOR
;

: TURNON
     14 1 DO
           I 2* 2PWRS + @ \ GET THE POWER OF 2
           0 DIFF @ - AND 0> \ TEST EACH ZONE
           IF
               I 2* 2PWRS + @ DUP
               I STATUS !   \ STORE THE NEW ZONE STATUS
               STAT +!      \ STORE THE OVERALL STATUS
           THEN
     LOOP
     MOTOR
;

( TRKUTIL.4TH       TEST UTILITIES )
( )
\ : TASK    ."    TRKUTIL.4TH    "  ;  ( EASY FORGET )
( )
: .GATE
 0  \ INITIALIZE THE STACK
 CR ." GATE POSITION " CR
     14 1 DO
       I . 2 SPACES
       I 10 < IF SPACE THEN
           I 3 = I 11 = OR
               IF 6 ELSE 4 THEN
           0 DO
```

```
                DUP GATE @ . 3 SPACES
                1+
        LOOP
        CR
    LOOP
    DROP
;
( )

: .GNEW
 0  \ INITIALIZE THE STACK
 CR  ." GNEW POSITION  " CR
    14 1 DO
        I . 2 SPACES
        I 10 < IF SPACE THEN
            I 3 = I 11 = OR
                IF 6 ELSE 4 THEN
            0 DO
                DUP GNEW @ . 3 SPACES
                1+
        LOOP
        CR
    LOOP
    DROP
;
( )
VARIABLE TP
( )
: .GTS
 0  \ INITIALIZE THE STACK
 CR
 ."       GATE POSITION                    GNEW POSITION"
 CR
    14 1 DO
        I 3 = I 11 = OR
            IF 6 4 TP ! ELSE 4 14 TP ! THEN
        I . 2 SPACES

I 10 < IF SPACE THEN
        0 DO
            DUP GATE @ . 3 SPACES
            1+
        LOOP
        TP @ SPACES
        I 3 = I 11 = OR
            IF 6 6 ELSE 4 4 THEN
            ROT SWAP - SWAP
        0 DO
            DUP GNEW @ . 3 SPACES
            1+
        LOOP
        CR
    LOOP
    DROP
;
( )
```

```
: .RPM
  0  \ INITIALIZE THE STACK
  CR
     8 1 DO
        I . 2 SPACES
        I 10 < IF SPACE THEN
           I 3 =
              IF 6 ELSE 4 THEN
           0 DO
              DUP RPM @ . 3 SPACES
              1+
           LOOP
           CR
     LOOP
     DROP
;

\ : TASK   ."   SETUP.4TH   " ;
9172 CONSTANT C1
4586 CONSTANT C2
( ************************************************ )
( THE FOLLOWING IS THE DATA READ IN BY THE SETUP PGM )
( )
VARIABLE ENAB 8191 ENAB !
CREATE SWATHS      ( SWATH ZONE 4 IS PROGRAMMABLE )
  14 , 14 , 10 , 4 , 3 , 3 , 4 , 0 ,
: SWATH   2* SWATHS + ;
CREATE SWCH
  496 , 248 , 992 , 1016 , 4 , 1024 , 1 , 0 ,
  0 , 0 , 0 , 0 , 0 , 0 , 0 , 0 , 0 ,   0 , ( 1 XTRA )

CREATE RATES
  0 , 0 , 5000 , 312 ,
  0 , 0 , 5000 , 312 ,
  0 , 0 , 5000 , 312 , 0 , 5000 ,
  0 , 0 , 5000 , 312 ,
  0 , 0 , 5000 , 312 ,
  0 , 0 , 5000 , 312 ,
  0 , 0 , 5000 , 312 ,   0 , ( 1 XTRA )
CREATE C
  1000 , 1000 , 1000 , 1000 ,
  1000 , 1000 , 1000 , 1000 ,
  1000 , 1000 , 1000 , 1000 , 1000 , 1000 ,
  1000 , 1000 , 1000 , 1000 ,
  1000 , 1000 , 1000 , 1000 ,
  1000 , 1000 , 1000 , 1000 ,
  1000 , 1000 , 1000 , 1000 ,
  1000 , 1000 , 1000 , 1000 ,
  1000 , 1000 , 1000 , 1000 ,
  1000 , 1000 , 1000 , 1000 , 1000 , 1000 ,
  1000 , 1000 , 1000 , 1000 ,
  1000 , 1000 , 1000 , 1000 ,   0 , ( 1 XTRA )

CREATE V
  0000 ,  0000 ,  0000 ,  0000 ,  0000 ,  0000 ,  0000 ,  0000 ,
  0000 ,  0000 ,  0000 ,  0000 ,  0000 ,  0000 ,  0000 ,  0000 ,
  6900 , 24190 ,  6900 , 24190 ,  6900 , 24190 ,  1000 ,  1000 ,
   810 ,  3200 ,  0810 ,  3200 ,  0450 ,  1600 ,  3000 ,  3000 ,
```

```
    0 , ( 1 XTRA )
\ CREATE HGUN
\   1 , -1 , 1 , 30 , 30 ,      0 , ( 1 XTRA )
( )
( ************************************** END OF SETUP DATA )
: RDSWATH
    7 0 DO
        6 I - SWATH !
    LOOP
;
: RDSWCH
    17 0 DO
        16 I - 2* SWCH + !
    LOOP
;
: RDRATES
    30 0 DO
        29 I - 2* RATES + !
    LOOP
;
: RDC
    56 0 DO
        55 I - 2* C + !
    LOOP
;
: RDV
    32 0 DO
        31 I - 2* V + !
    LOOP
;
: RDHGUNS
    5 0 DO
        5 I - 2* HGUNS + !

LOOP
;

( )
\ ( ***************************************************** )
\ ( THE FOLLOWING IS THE DATA READ IN BY THE SETUP PGM )

\ ( )
\   8191  ENAB !
\
\   ( SWATH ZONE 4 IS PROGRAMMABLE )
\   14  14  10  4  3  3  4
\   RDSWATH
\
\   496  248  992  1016  4  1024  1  0
\   0  0  0  0  0  0  0  0
\   RDSWCH
\
\   0  0    5000  312
\   0  0    5000  312
\   0  0    5000  312   0  5000
\   0  0    5000  312
\   0  0    5000  312
\   0  0    5000  312
\   0  0    5000  312
\   RDRATES
\
```

```
\    1000   1000   1000   1000
\    1000   1000   1000   1000
\    1000   1000   1000   1000   1000   1000
\    1000   1000   1000   1000
\    1000   1000   1000   1000
\    1000   1000   1000   1000
\    1000   1000   1000   1000
\    1000   1000   1000   1000
\    1000   1000   1000   1000
\    1000   1000   1000   1000
\    1000   1000   1000   1000   1000   1000
\    1000   1000   1000   1000
\    1000   1000   1000   1000
\  RDC
\
\    0000   0000   0000   0000   0000   0000   0000   0000
\    0000   0000   0000   0000   0000   0000   0000   0000
\    6900  24190   6900  24190   6900  24190   1000   1000
\     810   3200   0810   3200   0450   1600   3000   3000
\  RDV
\
\    1    1    1   30   30
\  RDHGUNS
   ( )
   ( ************* END OF SETUP DATA EXAMPLE )

\ : TASK ." SWITCHES.4TH " ;
( THIS APPLICATION READS THE OPTOMUX SWITCHES AND SAVES THE )
( DATA TO THE WORDS :   AUTOSW                              )
(                       CSWCH                               )
(                       MASTERSW                            )
PARAMETER-BLOCK RDSWCH
64 CONSTANT B_READ
65 CONSTANT B_WRITE
VARIABLE SWBD1    VARIABLE SWBD2
VARIABLE CSWCH
( )
: RD.SWBD1
   RDSWCH PARAMETERS !
   B_READ COMMAND !
   13 ADDRESS !
   OPTOWARE
   0 INFO @
   DUP DUP 8191 AND AUTOSW !
   -13 SHIFT CSWCH !
   SWBD1 !
;
( )
: RD.SWBD2
   RDSWCH PARAMETERS !
   B_READ COMMAND !
   14 ADDRESS !
   OPTOWARE
   0 INFO @
   DUP DUP 8191 AND 3 SHIFT CSWCH @ OR CSWCH !
   8192 AND -13 SHIFT MASTERSW !
   SWBD2 !
;
```

```
VARIABLE Z              ( REPLACES ZONE IN MIRROR SITUATIONS )
VARIABLE ZONE
VARIABLE GINDX
VARIABLE RINDX
VARIABLE GCHG
VARIABLE M

: RPMINDX       ( FIND THE INDEX FOR THE 1ST METER IN ZONE )
   ZONE @
     DUP 7 > IF 14 SWAP -          ( CORRECT FOR MIRROR IM. )
             THEN
                DUP Z !            ( AND STORE VARIABLE     )
     DUP 1- 4 * SWAP
     DUP 3 >                       ( SEE IF ZONE IS > 3 )
     IF SWAP 2 + SWAP              ( ADD 2 THEN PUT BACK ZONE )
     THEN
   DROP
\ DUP ." THE RINDX = " . CR     ( ********** TEST LINE )
  RINDX !
;
( MPH.4TH MODULE   -- CALCULATE TRUCK MPH )
( )
\ : TASK ."    MPH.4TH    " ;       ( EASY FORGET )
( VARIABLES AND CONSTANTS USED IN THIS MODULE )
30 CONSTANT MPHTIME  \ SECONDS IN TENTHS
1777 CONSTANT PULSE ( TIMES 1000 )
14  CONSTANT MPHPOS
VARIABLE CHGMPH     0 CHGMPH !
VARIABLE ACCEL      0 ACCEL !
VARIABLE MPHLIM     1 MPHLIM !
VARIABLE MPHRX100   0 MPHRX100    !
2VARIABLE MPHTIMER  0 0 MPHTIMER 2!
VARIABLE CHECKS     0 CHECKS !   \ CHECK # OF TIMES INTERRUPT
VARIABLE CHKAVG     0 CHKAVG !   \ IS CHECKED
VARIABLE SUMS 22 ALLOT ( )
VARIABLE TST       VARIABLE  LP
: TESTIT
    0 TST !   0 LP !
    BEGIN
        KEY DUP . 48 - DUP
        LP @ 0= IF 1 LP ! THEN
        DUP 0< IF  DROP 0 THEN
        LP @ * TST @ + TST !
        10 LP @ * LP !
        -35
    UNTIL
    TST @
    DUP ." TST = " . CR
;
( )
: SUM      \ FIND AVG # OF TIMES INTERRUPT IS TRIED
           \ SUM STRUCTURE -- SUMS - # OF SUM TRIALS
           \ SUMMATION PERFORMED ON 10TH TRIAL
\ ." SUM  "
    SUMS @ 8 >
    IF
      CHECKS @  ( CURRENT SUM )
```

```
        10 1 DO
            I 2* SUMS + @ +
        LOOP
        10 / CHKAVG !
        0 SUMS !
     ELSE
            1 SUMS +!
            CHECKS @ SUMS @ 2* SUMS + !
     THEN
;
( )
VARIABLE TIMEERROR
     1 TIMEERROR !
VARIABLE CMPH
     1000 CMPH !

: GETCTR
    OMUX PARAMETERS !
    14 ADDRESS !
    23 COMMAND !
    14 0 POSITIONS !  -1 1 POSITIONS !
    OPTOWARE ERRCHK
    14 INFO @  MPHTIME  10 * DUP TIMEERROR @ + */MOD
    SWAP MPHTIME  10 * 2 / >
        IF
            1+
        THEN
    CMPH @ 1000 */      ( ALLOWS CALIB OF MPH SIGNAL )
;
( )
: CLRCTR
    OMUX PARAMETERS !
    14 ADDRESS !
    24 COMMAND !
    14 0 POSITIONS !  -1 1 POSITIONS !
    OPTOWARE
;
( )
: STARTCTR
    OMUX PARAMETERS !
    14 ADDRESS !
    20 COMMAND !
    14 0 POSITIONS !  -1 1 POSITIONS !
    OPTOWARE
    MPHTIME 10 * 0 CLOCK.TICK 2@ D+ MPHTIMER 2!
 \  SUM    0 CHECKS !
;
( )

: CALCMPH   ( GETCTR OUTPUT SHOULD BE ON STACK )
     PULSE   MPHTIME   / * MPHRX100 !
 \  ." MPHRX100 = " MPHRX100 @ . CR
;
( )
: CALC.MPHLIM
    MPHRX100 @ 5 * 100 / MPHLIM !
 \  ." MPHLIM = " MPHLIM @ . CR
;
( )
```

```
: REPMPH
    MPHRX100 @ 100 / MPHR !
    1 CHG.MPH !
\    ." NEW MPH = " MPHR @ .
;
( )
: CHKLIMITS
    MPHR @ 100 * MPHLIM @ - MPHRX100 @ > IF REPMPH THEN
    MPHR @ 100 * MPHLIM @ + MPHRX100 @ < IF REPMPH THEN
;
VARIABLE MPHDN   \ IF 1 THEN DO CONSUMPTION CALCS
( )

: GETMPH
    GETCTR
    CALCMPH
    CALC.MPHLIM
    CHKLIMITS
    CLRCTR
    STARTCTR
    1 MPHDN !
\   ." MPHR = "  MPHR ?  ."         # CHKS = " CHKAVG ?   CR
;
( )
: CHK.MPHTMR
    CLOCK.TICK 2@ MPHTIMER 2@ D>
    IF
        CLOCK.TICK 2@ MPHTIMER 2@ D-
        .DROP TIMEERROR !
        GETMPH
\   ELSE
\       1 CHECKS +!
\       ." CHK.MPH "   ( TESTLINE )
    THEN
;
( )
: TESTMPH
    BEGIN
        CHK.MPHTMR
        ?KEY
    UNTIL
;
( CALCRPM.4TH FILE   -- GATE POSITION & METER SPEED CALC )
( )
\ : TASK   ."    CALCRPM.4TH   "   ;  ( EASY FORGET )
( )
( )
: GATEINDX        ( FIND THE INDEX FOR THE 1ST GATE IN ZONE )
  ZONE @ DUP 1- 4 * SWAP
    DUP 3 >                       ( SEE IF ZONE IS > 3 )
    IF SWAP 2 + SWAP              ( ADD 2 THEN PUT BACK ZONE )
        DUP 11 >                  ( SEE IF ZONE IS > 11 )
        IF SWAP 2 + SWAP          ( ADD 2 THEN PUT BACK ZONE )
        THEN
    THEN
  DROP
\ DUP ." THE GINDX = " .   ( ********** TEST LINE )
  GINDX !
;
( )
```

```
( )
: VINDX
\   DUP ." THE I = " . CR    ( ********** TEST LINE   )
    DUP 3 > IF 3 - THEN ( ACCT FOR ZN 3,11        )
    8 *         ( LOOP INDEX VARIES FROM 0 TO 3 )
\   DUP ." THE INIT VINDX = " . CR   ( ********** TEST LINE  )
    Z @
    DUP 3 =
        IF 2 SWAP
            ELSE
            DUP 3 >

IF 4 SWAP
                ELSE 0 SWAP
                THEN
        THEN
    DROP
\   DUP ." THE CALC VINDX = " . CR   ( ********** TEST LINE  )
    GINDX @ GATE @ 0> IF 1+ THEN +
\   DUP ." THE VINDX = " . CR    ( ********** TEST LINE  )
;
( )
: RUNTEST
\   CR         ." ENTERED RUNTEST "
    DUP 10 <
        IF
\           ."   RPM < 10
            GINDX @ GATE @ 1 =
                IF
                ."   AND CHANGING FROM " DUP .
                0 GINDX @ GNEW !
                SWAP
                DUP ( DUP . ) @       ( GET ORIG V )
\           ." V = " DUP .
                SWAP 2 - ( DUP . ) @   ( GET VIN -1 )
\           ." V-1 = " DUP .
                */           ( CORRECT THE SPEED )
\           ."   TO " DUP . CR
                1 GCHG !
                ELSE
                    SWAP DROP
                THEN
        ELSE
            DUP 50 >
            IF
            ."   RPM > 50  "
\           GINDX @ GATE @ 0=
                IF
                ."   AND CHANGING  FROM " DUP .
                1 GINDX @ GNEW !
                SWAP DUP ( DUP . ) @ \ GET ORIG V
\           ." V = " DUP .
                SWAP 2 + ( DUP .) @   \ GET VIN +1
\           ." V+1 = " DUP .
                */           ( CORRECT THE SPEED )
\           ." TO " DUP . CR
                1 GCHG !
                ELSE
                    SWAP  DROP
```

```
                        THEN
                ELSE
                        SWAP DROP
                THEN
        THEN
;
( )
: CCRPM
    DUP 0> IF
            */
\ DUP ." C * C1 / V    = "  .  CR
        RINDX @ 2* RATES + @
\ DUP ." THE RATE = " . CR    ( ********** TEST LINE  )
        Z @ 1-   SWATH @
\ DUP ." THE SWATH = " . CR   ( ********** TEST LINE  )
        M @
\ DUP ." THE MPH = " . CR    ( ********** TEST LINE  )
        * 1000 */  1000 */  10 /MOD SWAP \ DUP ." MOD " .
        4 > IF 1+ THEN
        RUNTEST
    ELSE
        DROP DROP DROP DROP 0
    THEN
;

( )
: CRPM
Z @ 3 = IF 6 ELSE 4 THEN ( PUT METERS/ZONE ON STACK )
    0 DO
        I VINDX  2* ( DUP .) V + DUP @  \ PLACES VINDX , V ON STK
\ DUP ." THE V = " . CR    ( ********** TEST LINE  )
        GINDX @ 2* C + @ C1  ( C , C1  ON THE STACK )
        Z @ 3 = IF
            I 0=  I 3 = OR
                IF
                    NOOP
                ELSE
                    2 /  ( THIS REPLACES C2 )
                THEN
        THEN
\ DUP ." THE CFACTOR = " . CR    ( ********** TEST LINE  )
        2 ROLL ( STK BECOMES V C1 C VINDX {BOT} )
        CCRPM
\ DUP ." THE ****************** RPM = " . CR  ( TEST LINE )
        RINDX @  RPM !
1 GINDX +!
1 RINDX +!
LOOP
;
( )
: GETRPM
    MPHR @ DUP 5 < IF 5 M ! DROP ELSE M ! THEN
    GATEINDX
    RPMINDX
    CRPM

;
( )
```

```
    TESTRPM
       ZONE !
  CR TIME@ .TIME
       GETRPM
  CR TIME@ .TIME
 ;

\ : TASK ." CHGGATE.4TH  " ;

VARIABLE TOP
CREATE ADRS 0 C, 0 C,  4 C, 12 C, 16 C,
             20 C, 24 C, 28 C, 24 C,
             20 C, 16 C,  8 C,  4 C,  0 C,
( )
: GETADRS    ( N --- )( 0 < N < 14 )
\ CALCULATE THE BOARD AND BANK # FOR THE ZONE'S GATE CONTROL
    DUP DUP 3 = SWAP 11 = OR
        IF
          6 TOP !
        ELSE
          4 TOP !
        THEN
    DUP ZONE !
    DUP ADRS + C@ ( DUP ." ADRS " .) ADDRESS !
    DUP 3 = SWAP DUP 7 = ROT OR SWAP DUP 11 = ROT OR
       ( CALC THE BANK # )
       IF 1 POSITION !
       ELSE
            DUP DUP 2 = SWAP 4 =  OR
            SWAP DUP 5 = ROT OR
            SWAP DUP 6 = ROT OR
            SWAP DUP 13 = ROT OR
            IF
              2 POSITION !
            ELSE
              0 POSITION !
            THEN
       THEN
    DROP
\   CR ." POSITION = " POSITION @ .   ( *******TEST LINE )
;

( )
: SETDIR      ( --- VL   )
    ( REQUIRES ZONE SET & GINDX CALCULATED )
    0   \ INITIALIZE THE STACK WITH VL = 0
\   CR  ." SET THE FWD/REV RELAYS  "
            4 0 DO    ( SET FWD/REV RELAYS )
              GINDX @ I + DUP GNEW @ SWAP GATE @ <
              IF
                I 1+ 2* 1- 2* 2PWRS + @ + ( SET THE VL{I} )
\              ." PSN = " I . ." VL = " DUP .   ( ****TEST LINE )
              THEN
            LOOP
\ ." F/R RELAY VALUE = "  DUP .

;
( )
```

```
: SET4GATES      ( VL  ---  VL )
\ CR  ."  ( NOW TURN ON THE PROPER GATES ) "
          4 0 DO
                  GINDX @ I + DUP DUP GATE @
                                    SWAP GNEW @ DUP
                                    ROT
                  ( STACK - VL INDX GNEW GNEW GATE )
                  < >
                  IF
\     CR ."   GATE & GNEW PSN "  I . ." ARE DIFFERENT "
                  SWAP GATE ! ( STORE THE NEW GATE PSN )
                  I 1+ 2*  2* 2PWRS + @ + ( SET THE VL{I} )
                  ELSE
\     CR ."   GATE & GNEW PSN "  I . ." ARE THE SAME "
                      DROP DROP
                  THEN
          LOOP
\    ." GATE MOTOR DATA = "  DUP .
;

( )
: SET2GATES     (  ---  VL  )
          2 POSITION !
          0 \ INITIALIZE STACK W/ NEW VL
          GINDX @ 3 +        ( PUT NEW GINDX ON STACK )
      3 1 DO
          1+  ( INCREMENT THE LOOP )
                              ( SEE IF REV NEEDS SET )
          DUP DUP GATE @ SWAP GNEW @ >
          IF
              DUP 0 SWAP GATE ! ( RECORD NEW PSN )
              SWAP  ( PUT VL ON TOP OF STACK )
              I I * 3 * + ( ADD 3 OR 12 TO VL )
              SWAP  ( PUT INDX BACK ON TOP )
          ELSE
              DUP DUP GATE @ SWAP GNEW @  <
                IF
                  DUP 1 SWAP GATE ! ( RECORD NEW PSN )
                  SWAP  ( PUT VL ON TOP OF STACK )
                  I I * 2 * + ( ADD 2 OR 8 TO VL )
                  SWAP ( PUT INDX BACK ON TOP )
                ELSE
                  NOOP   ( NO CHANGE RQD )
                THEN
          THEN
      LOOP
   DROP  ( LEAVE ONLY VL ON STACK )
;

( )
: CHGGATE
```

```
        PMUX PARAMETERS !
        10 COMMAND !
\ CR    ." CHGGATE "     ( ********* TESTLINE )
        14 1 DO
\ CR    ." ZONE " I .   I STATUS @ . ( ******* TEST LINE )
            I STATUS @ 0>     ( MAKE SURE THE ZONE IS ON )
            IF
                I GETADRS
                GATEINDX   \ GET THE 1ST GATE INDEX OF THIS ZONE
                SETDIR     \ SET FWD/REV RELAYS
                SET4GATES
                    0 INFO !  \ STORE THE VL DATA
                    PAMWARE
                TOP @ 6 =
                IF
                    SET2GATES
                    0 INFO !
                    PAMWARE
                THEN
            THEN
        LOOP
;

( )
: PRTSTATUS
    CR 0 ZONE !
    BEGIN
        ZONE @ DUP . ." =" STATUS @ .
        2 SPACES
        1 ZONE +!
        ZONE @ 13 >
    UNTIL
;
( CHKGATE.4TH ROUTINE                                            )

\ : TASK  ."   CHKGATE.4TH   "     ;  ( EASY FORGET  )

: GETWET
\ ." ENTERED GETWET "
    MPHR @ DUP 20 >
        IF
            14
        ELSE
            DUP 10 >
            IF
                6
            ELSE
                DUP 2 >
                IF
                    2
                ELSE
                    0
                THEN
            THEN
        THEN
        SWAP DROP
\ ." WET = " DUP  . (   TEST LINE ONLY )
    DUP WET @ <>
        IF
```

```
              WET !
              MOTORS PARAMETERS !
              28 ADDRESS !
              10 COMMAND !
              3 POSITION !
                 7 STATUS @
                0> IF 16 WET @ + 0 INFO !
                    ELSE WET @   0 INFO !
                  THEN
           PAMWARE
\ ." WET STATUS CHANGED "
         ELSE
            DROP
\ ."   WET STATUS NO CHANGE "
         THEN
  \ CR
;

( )
( SCALING CONSTANTS USED IN AOWRT )
0   CONSTANT LORPM
60 CONSTANT HIRPM
0   CONSTANT LOVOLT ( VOLTS / 10 * 4095 )
2457 CONSTANT HIVOLT ( 6 / 10 * 4095 )
41 CONSTANT SCALER   ( HIVOLT-LOVOLT/HIRPM-LORPM )
VARIABLE OFFSET
PARAMETER-BLOCK ANALOGS
( )
: AOWRT
    8 0 DO
          I OFFSET @ + ( DUP .) RPM @  ( GET THE RPM )
          ( DUP IS FOR TEST ONLY )
          DUP HIRPM > IF DROP HIRPM THEN ( CHECK IT )
          DUP LORPM < IF DROP LORPM THEN
          SCALER * LOVOLT +    ( SCALE IT )
          I INFO !             ( STORE IT )
    LOOP
    PAMWARE
;
( )
: CHGRPM
\ CR ." RPM VALUES WRITTEN TO THE OUTPUTS  "   CR
ANALOGS PARAMETERS !
18 COMMAND !
36 ADDRESS !   ( DO THE FIRST ANALOG BOARD )
    0 POSITION !   0 OFFSET !    AOWRT
    1 POSITION !   8 OFFSET !    AOWRT
38 ADDRESS !   ( NOW DO THE SECOND BOARD  )
    0 POSITION !  16 OFFSET !    AOWRT
    1 POSITION !  24 OFFSET !    AOWRT

;
: DECODZN
    0 ZONE !
    BEGIN
      1 ZONE +!
```

```
            ZONE @ 2* 2PWRS + @
            HGUNS @    AND
         UNTIL
  ;
  : SETSPD
        RPMINDX
        5 1 DO
          I 1+ HGUN @
          I 1- RINDX @ + RPM !
        LOOP
        CHGRPM
  ;
  ( )
  : RDTRIGGER  \ TRIGGER SWITCH SHOULD BE ON BOARD 15
        171 P@   \ ( ADDRESS 40 ) TERMINAL # 30
        32 AND
  ;
  : HANDGUN
        1 HGUN @ 0>
        IF
         DECODZN
         SETSPD
         RDTRIGGER
         0=
           IF
              O HGUNS !
           THEN
        THEN
  ;
  : DECODSW
         0  ( INITIALIZE STACK FOR CONDSW )
         17 0 DO
             I 1+ 2* 2PWRS + @
             CSWCH @    AND  ( DECODE THE SWITCH VALUE )
             I 6 =
             IF
               DUP  HGUNS !
               0>
               IF
                  HANDGUN
               THEN
             ELSE
               0<>
               IF
                   I 2* SWCH + @ ( GET VALUE )
                   +      ( ADD TO STACK      )
               THEN
             THEN
         LOOP
         CONDSW !
  ;
  ( )
  ( THE FOLLOWING WORD READS THE OPTOMUX SWITCHES AND ASSIGNS )
  ( THE PROPER VALUES TO THE SWITCH VARIABLES                 )
  ( )
  : DO.SWCHES   RD.SWBD1 RD.SWBD2 DECODSW   ;
  ( )
  ( )
```

```
: GETRPMS
\   CR
    0 GCHG !
    14 1 DO
        ENAB @ I 2* 2PWRS + @ AND I STATUS @ AND
        IF
            I ZONE !
            GETRPM
        THEN
    LOOP
\ ." GOT RPMS "   CR
;
( )
: CHKGATE
    GETRPMS
    GETWET
    CHGRPM ( DO ANALOGS )
    GCHG @ 0>
        IF
            CHGGATE  ( FOR ALL ZONES )
        THEN
;
( )
: CMPSTATES    STAT @   NEWSTATE @  -   DUP DUP DIFF !
               0<>
                  IF
                     0<
                       IF
                          TURNON
                          CHKGATE
                          0 CHGMPH !
                       ELSE
                          TURNOFF
                       THEN
                       1 MPHDN !
\           ." DIFF = " DIFF ?    CR
                  ELSE
                       DROP
\           ." DIFF = 0 "   CR
                  THEN
;
```

```
VARIABLE FLOWS 114 ALLOT
    : FLOW 2* FLOWS   + ;
    FLOWS 114 0 FILL
(         FLOW BOARD LAYOUTS                                      )
(   BANK      !    0    !    1    !    2    !    3    !          )
(   ZONE-BD1  !  1   2  !  3   3  !  4   5  !  6   7  !           )
(   ZONE-BD2  ! 13  12  ! 11  11  ! 10   9  !  8  SP  !           )
```

```
( )
: RDFLOW1
    0  \ INITIALIZE THE STACK FOR FLOW INDEX
    164 160 DO
        I P@
        I 161 = IF  7 ELSE 9 THEN
            1 DO
                DUP I 2* 2PWRS + @ AND 0>
                IF
                    SWAP 1 SWAP DUP ROT SWAP   FLOW I 1+ SWAP
                ELSE
                    SWAP 0 SWAP DUP ROT SWAP   FLOW I 1+ SWAP
                THEN
            LOOP
            DROP
    LOOP
    0 LASTMI !
VARIABLE MILE
    0 MILE !
VARIABLE MILECT
    0 MILECT !
VARIABLE FT
    0 FT !
VARIABLE NEWFT
    0 NEWFT !
VARIABLE LASTFT
    0 LASTFT !
VARIABLE SUMFT
    0 SUMFT !
VARIABLE DELTA
    0 DELTA !
VARIABLE MICONS 112 ALLOT   \ PARTIAL TOTAL OF MILE DATA
    : MICON    2* MICONS +  ;
    MICONS 112 0 FILL
VARIABLE LSTMICONS 112 ALLOT    \ MILE CONSUMPTION TO DISPLAY
    : LSTMICON   2* LSTMICONS +  ;
    LSTMICONS 112 0 FILL
VARIABLE TOTALCONS 112 ALLOT
    : TOTALCON   2* TOTALCONS + ;
    TOTALCONS 112 0 FILL
VARIABLE MIACRES 112 ALLOT  \ PARTIAL TOTAL OF MILE DATA
    : MIACRE   2* MIACRES +  ;
    MIACRES 112 0 FILL
VARIABLE LSTMIACRES 112 ALLOT    \ MILE CONSUMPTION TO DISP
    : LSTMIACRE   2* LSTMIACRES +  ;
    LSTMIACRES 112 0 FILL
VARIABLE TOTALACRES 112 ALLOT
    : TOTALACRE    2* TOTALACRES + ;
    TOTALACRES 112 0 FILL
VARIABLE SIMET   \  SIMPLIFIED SEC  - .1 SEC UNITS
    0 SIMET !
VARIABLE NEWTIME
    0 NEWTIME !
6000 0 2CONSTANT MINUTE
2VARIABLE ET
    0 0 ET 2!
2VARIABLE LASTTIME
    0 0 LASTTIME 2!
VARIABLE STARTTIME   6 ALLOT
```

```
: PRINTON    17 EMIT ;

: PRINTOFF  27 EMIT 79 EMIT 3 EMIT ;

: SETSTTIME
    TIME@
    STARTTIME !         \ STORE SECONDS
    STARTTIME 2 + !     \ STORE MINUTES
    STARTTIME 4 + !     \ STORE HOURS
;
: GETSTTIME
    STARTTIME 4 + @    \ GET HOURS
    STARTTIME 2 + @    \ GET MINUTES
    STARTTIME @        \ GET SECONDS
\ USE .TIME  TO PRINT THE STARTTIME
;
VARIABLE CORRECTIONS   606 ALLOT
        CORRECTIONS 606 0 FILL
: SET   \ ( MILE --- ) USED TO SET MILEPOST #
    CORRECTIONS @ DUP 99 > IF 100 - THEN
    6 * 2 + CORRECTIONS +   \ CALC INDEX - ROTATE IF > 100 CORRECTI
    1 CORRECTIONS +!        \ INCREMENT THE CORRECTION RECORD
    DUP LASTMI @ SWAP !     \ RECORD OLD VALUE
    SWAP DUP LASTMI !              \ CORRECT LASTMI
    SWAP DUP ROT SWAP 2 + !    \ RECORD NEW VALUE (MILEPOST)
    DUP HOURS@ SWAP 4 + C!  \ STORE HOURS
    MINUTES@ SWAP 5 + C!    \ STORE MINUTES ( STACK EMPTY )
    CLOCK.TICK 2@ LASTTIME 2!  \ RESET THE TIME VARIABLE

;
: .CORRECTIONS
    PRINTON
    CR  CR CR CR CR CR
    ." THERE WERE " CORRECTIONS @ . ." CORRECTIONS." CR
    CR
    ." OLD MILE #     NEW MILEPOST            TIME" CR
    CORRECTIONS @
    0 DO
        I 6 * 2 + CORRECTIONS +
        I 1+ . 2 SPACES
        DUP ? 12 SPACES
        DUP 2 + ? 17 SPACES
        DUP 4 + C@ . ." : "
        5 + C@ .
        CR
    LOOP
    PRINTOFF

;
: START       \ RESET ALL VARIABLES
    CORRECTIONS 606 0 FILL
    MICONS 112 0 FILL
    TOTALCONS 112 0 FILL
    LSTMICONS 112 0 FILL
    MIACRES 112 0 FILL
    TOTALACRES 112 0 FILL
    LSTMIACRES 112 0 FILL
    DUP LASTMI !
        STARTMI !
    SETSTTIME
    0 0 LASTTIME 2!
```

```
        0 0 CLOCK.TICK 2!
        0 FT !
        0 SUMFT !
        0 MILECT !
        MPHTIME 10 * 0 CLOCK.TICK 2@ D+ MPHTIMER 2!

;
: ETIME       \ ELAPSED TIME IN .01 SECONDS
    CLOCK.TICK 2@ 2DUP
    LASTTIME 2@ D- 2DUP ET 2!
    2SWAP LASTTIME 2!                    \ RESET LASTTIME
    2DUP MINUTE D>          \ SIMPLIFY TO .1SEC UNITS
        IF
            6000 UM/MOD ( STACK IS SEC X.01,MIN )
            DUP 50 >
                IF
                    DROP DROP  0 \ ERROR - SET TO 0
                ELSE
                    600 * +     \ CONVERT TO .1 SEC
                THEN
        ELSE
            DROP  \ CONVERT TO S PRECISION
            10 /  \ CONVERT TO .1 SEC
        THEN
        SIMET !
;
: .MIDATA
    PRINTON
    CR CR CR CR CR   CR CR
    15 SPACES ."          ZONE CONSUMPTION DATA    "   CR
    ."    STARTING MILE POST   " STARTMI ? 10 SPACES
    ."    CURRENT MILE POST    " LASTMI ?  5 SPACES
    TIME@ ..TIME CR
    CR ." ZONE    BIN A      BIN B       BIN C       BIN D "
    ."     BIN B'     BIN C'"             CR CR
    14 1 DO
        I ZONE !
        GATEINDX
        I 3 = I 11 = OR
        IF
            6
        ELSE
            4
        THEN
        I 0 <# # # #> TYPE 2 SPACES
        0 DO
            GINDX @ LSTMICON @
            0 <# # # # # #>
            TYPE
            SPACE
            GINDX @ LSTMIACRE @
            0 <# # # # # #>
            TYPE
            2 SPACES
            1 GINDX +!
        LOOP
        CR
    LOOP
CR CR
```

```
PRINTOFF
;
: CALCACRES
    FT @ 10 *  Z @ 1- SWATH @ 10 * 4356 */
;
: CHKFT    \ DELTA FT MUST BE ON STACK
           SUMFT @ DUP LASTFT !
           + ( GET NEW SUMFT )
           DUP 5280 >
           IF
              5280 - DUP SUMFT !
              FT @ SWAP - NEWFT !
              FT @ NEWFT @ - DUP FT !
              SIMET @ DUP ROT DELTA @ */
              DUP SIMET ! - NEWTIME !
              1 LASTMI +!
              1 MILECT +!
           ELSE
              SUMFT !
              0 DELTA !
              0 NEWFT !
           THEN
;
: CALCFT
   ET 2@ 2DUP MINUTE D>
      IF
         6000 UM/MOD ( STACK IS SEC X.01,MIN )
         MPHR @ 88 *   ( FT TRAVELED PER MINUTE )
         SWAP MPHR @ 750 */ 11 *  ( FT TRAV PER SEC )
         + ( ADD THE TWO DISTANCES )
         DUP FT !
         DUP DELTA !  \ STORE DISTANCE IN CASE WE PASS MI
         CHKFT
      ELSE
         DROP ( CONVERT BACK TO S PRECISION )
         MPHR @ 750 */ 11 *  ( FT TRAV PER SEC )
         DUP FT !
         DUP DELTA !  \ STORE DISTANCE IN CASE WE PASS MI
         CHKFT
      THEN
;
: DIV10    10 /MOD SWAP 4 > IF 1+ THEN ;
: DIV100   100 /MOD SWAP 49 > IF 1+ THEN ;

: CALCLBS
    SWAP
    RINDX @ RPM @ 60 */MOD
    SWAP  29 > IF 1+ THEN \ ADJUST FOR THE REMAINDER
    SWAP
    VINDX 2* V + @ 10000 */MOD
    SWAP  4999 > IF 1+ THEN \ ADJUST FOR THE REMAINDER
    2205 10000 */MOD   \ ANSWER IS .01 LBS
    SWAP  4999 > IF 1+ THEN \ ADJUST FOR THE REMAINDER
       GINDX @ MICON +!
       CALCACRES   GINDX @ MIACRE +!
;
```

```
: CALCCONS
    READ.FLOW
    SIMET @   \ PUT ETIME ON STK W/ .1SEC UNITS
\ ." CALCCONS    SIMET = "  DUP .  CR
    14 1 DO
    I 2* 2PWRS + @ STAT @ AND 0>
    IF
\       ." ZONE " I .     ( TESTLINE )
        I ZONE !
        GATEINDX
        RPMINDX
            I 3 = I 11 = OR
            IF
              6
            ELSE
              4
            THEN
        0 DO
            GINDX @ FLOW @  0>
            IF
               DUP \ LEAVE SIMET ON STACK
               I CALCLBS
            THEN
            1 GINDX +!
            1 RINDX +!
        LOOP
\       CR      ( TEST LINE )
    THEN
    LOOP
DROP  \ GET SIMET OFF THE STACK
;
: 2.  \ PRINT TOP 2 #'S OF STACK
DUP ROT DUP ROT 2SWAP SWAP . .
;

: .SUMDATA
    PRINTON
    CR CR CR CR CR   CR CR
    15 SPACES ." CURRENT ZONE CONSUMPTION DATA   "   CR
    ." STARTING MILE POST  " STARTMI ? 5 SPACES
    ." CURRENT MILE POST   " LASTMI ?  5 SPACES
    ." NEW FEET " SUMFT ? 2 SPACES
    TIME@  .TIME CR
    CR ."   ZONE   BIN A      BIN B      BIN C      BIN D "
    ."       BIN B'     BIN C'"          CR CR
    14 1 DO
        I ZONE !
        GATEINDX
        I 3 = I 11 = OR
        IF
          6
        ELSE
          4
        THEN
        I 0 <# # # #> TYPE 4 SPACES
```

```
              O DO
                 GINDX @ MICON @
                 O <# # # # # #>
                 TYPE
                 SPACE
                 GINDX @ MIACRE @
                 O <# # # # # #>
                 TYPE
                 2 SPACES
                 1 GINDX +!
              LOOP
              CR
      LOOP
   CR CR
   PRINTOFF
   ;

: .TDATA
      PRINTON
      CR CR CR CR CR   CR CR
      15 SPACES  ." TOTAL ZONE CONSUMPTION DATA   "   CR
      ." STARTING MILE POST  " STARTMI ?  5 SPACES
      ." CURRENT MILE POST   " LASTMI ?  5 SPACES
      ." MILES " MILECT ? 2 SPACES
      TIME@  .TIME CR
      CR  ."  ZONE    BIN A      BIN B      BIN C      BIN D "
      ."      BIN B'     BIN C'"           CR CR
      14 1 DO
           I ZONE !
           GATEINDX
           I 3 = I 11 = OR
           IF
              6
           ELSE
              4
           THEN
           I 0 <# # # #> TYPE 4 SPACES
           0 DO
              GINDX @ TOTALCON @
              0 <# # # # # #>
              TYPE
              SPACE
              GINDX @ TOTALACRE @
              0 <# # # # # #>
              TYPE
              2 SPACES
              1 GINDX +!
           LOOP
           CR
      LOOP
   CR CR
   PRINTOFF
   ;
   ( : TASK   ."   PRINT1.4TH   "   ;)
   VARIABLE PRT
      0 PRT !
   VARIABLE CROSSING  20 ALLOT
      6147 CROSSING !
   VARIABLE SIGNALS  20 ALLOT
      1028 SIGNALS !
```

```
VARIABLE SHOULDERS   20 ALLOT
    792 SHOULDERS !
VARIABLE BALLAST   20 ALLOT
    224 BALLAST !
: .DATE
    DATE@
    SWAP ROT   \ GET STACK IN Y D M ORDER
    . ." /" . ." /" .
;

: ADDMIDATA
    2+ DUP GINDX @ LSTMICON @
    10 /MOD SWAP 4 > IF 1+ THEN
    SWAP +!
    2+ DUP GINDX @ LSTMIACRE @
    100 /MOD SWAP 49 > IF 1+ THEN
    SWAP +!
;
: ADDTOTDATA
    2+ DUP GINDX @ TOTALCON @  SWAP +!
    2+ DUP GINDX @ TOTALACRE @ SWAP +!
;
: SUMDATA
CROSSING  2+ 18 0 FILL
SIGNALS   2+ 18 0 FILL
SHOULDERS 2+ 18 0 FILL
BALLAST   2+ 18 0 FILL
    14 1 DO
        I ZONE !
        GATEINDX
            I 2* 2PWRS + @   \ MATCH ZONE WITH DESCRIPTION
            DUP CROSSING @ AND 0>
               IF CROSSING ELSE
            DUP SIGNALS @ AND 0>
                IF SIGNALS   ELSE
            DUP SHOULDERS @ AND 0>
                 IF SHOULDERS  ELSE
            DUP BALLAST @ AND 0>
                  IF BALLAST
                  THEN
                 THEN
                THEN
               THEN
        SWAP DROP
        I 3 = I 11 = OR
        IF
           6
        ELSE
           4
        THEN
        0 DO
            I 4 = IF 12 - THEN
            PRT @ 0=
            IF
               ADDMIDATA
            ELSE
               ADDTOTDATA
            THEN
            1 GINDX +!
```

```
            LOOP
            DROP
       LOOP
  ;
  : PRINTIT
       PRINTON
       CR CR
       60 SPACES  .DATE CR
       60 SPACES TIME@ .TIME CR
       CR CR
       PRT @ 0=
       IF
       20 SPACES  ."          MILE CONSUMPTION DATA   "   CR
       28 SPACES  MPHR ? ." MILES PER HOUR"  CR CR
       ELSE
       20 SPACES  ."         TOTAL CONSUMPTION DATA   "   CR
       28 SPACES  MILECT ? ." MILES TRAVELED"  CR CR
       THEN
       ."    STARTING MILE POST  " STARTMI ? 10 SPACES
       ."    CURRENT MILE POST   " LASTMI ?  CR
       CR
       ."            CROSSING          SIGNALS           SHOULDERS"
       ."             BALLAST "  CR
       ."          LBS    ACRES       LBS    ACRES       LBS    ACRES"
       ."         LBS    ACRES  "  CR
       ." BIN " CR
       4 0 DO
           I
           DUP 0= IF ."  A"  THEN
           DUP 1 = IF ."  B"  THEN
           DUP 2 = IF ."  C"  THEN
           DUP 3 = IF ."  D"  THEN
           DROP
           3 SPACES
              I 2* 1+  \ PUT INITIAL INDEX ON STACK
              DUP 2* CROSSING + @
              10 /MOD 4 U.R ." ." 1 U.R
              SPACE
              DUP 2* CROSSING + 2+ @
              10 /MOD 4 U.R ." ." 1 U.R
              3 SPACES
              DUP 2* SIGNALS + @
              10 /MOD 4 U.R ." ." 1 U.R
              SPACE
              DUP 2* SIGNALS + 2+ @
              10 /MOD 4 U.R ." ." 1 U.R
              3 SPACES
              DUP 2* SHOULDERS + @
              10 /MOD 4 U.R ." ." 1 U.R
              SPACE
              DUP 2* SHOULDERS + 2+ @
              10 /MOD 4 U.R ." ." 1 U.R
              3 SPACES
              DUP 2* BALLAST + @
              10 /MOD 4 U.R ." ." 1 U.R
              SPACE
              DUP 2* BALLAST + 2+ @
              10 /MOD 4 U.R ." ." 1 U.R
              3 SPACES
```

```
        CR  DROP
      LOOP
  CR CR   CR CR CR
   PRINTOFF
 ;
 : PRTMIDATA
      0 PRT !
      SUMDATA
      PRINTIT
 ;
 : PRTTOTDATA
      1 PRT !
      SUMDATA
      PRINTIT
 ;
 : XFRMIDAT
      56 0 DO
      I MICON @ DUP I LSTMICON !
      DIV10 I TOTALCON +!
      I MIACRE @ DUP I LSTMIACRE !
      DIV100 I TOTALACRE +!
      LOOP
 ;
 : DOCONSUMPTION
      ETIME
      CALCFT
      CALCCONS
      DELTA @ 0>
           IF
              XFRMIDAT
              PRTMIDATA
              MICONS 112 0 FILL
              MIACRES 112 0 FILL
              NEWFT @ FT !
              NEWTIME @ SIMET !
              CALCCONS
              0 DELTA !
           THEN
 ;
 : TASK    ."  FLOWTEST  " ;

VARIABLE FLOWSTATS 28 ALLOT
     FLOWSTATS 28 0 FILL
     : FLOWSTAT  2* FLOWSTATS + ;
VARIABLE FLASHERS 28 ALLOT
     FLASHERS 28 0 FILL
     : FLASHER  2* FLASHERS + ;
VARIABLE CHGFLASH
     0 CHGFLASH !
 : CHKFLOW            \   0 = NO FLOW BUT OK
     READ.FLOW        \  >9 = FLOW PROBLEM
     14 1 DO          \   0 < X < 10  GOOD FLOW
     I 2* 2PWRS + @ STAT @ AND 0>
     IF
  \   ." ZONE " I .    ( TESTLINE  )
         I ZONE !
         0 I FLOWSTAT !
         GATEINDX
```

```
            RPMINDX
                I 3 = I 11 = OR
                IF
                    6
                ELSE
                    4
                THEN
            0 DO
                RINDX @ RPM @   0>
                IF
                    GINDX @ FLOW @  0>
                    IF
                      1 ZONE @ FLOWSTAT +!
                    ELSE
                      10 ZONE @ FLOWSTAT +!
                    THEN
                ELSE
                    0 ZONE @ FLOWSTAT +!
                THEN
                1 GINDX +!
                1 RINDX +!
            LOOP
            I FLOWSTAT @                        \  BAD FLOW
            DUP 9 > I FLASHER 1 < AND           \  AND NO FLASH
            IF
                    1 CHGFLASH !                \  TURN ON FLASH
            THEN                                \  OR
            9 <  I FLASHER @ 0> AND             \  FLOW IS OK
            IF
                1 I CHGFLASH !                  \  AND FLASH IS ON
                -1 I FLASHER !                  \  TURN IT OFF
            THEN
    \ I FLOWSTAT ? CR     ( TEST LINE )
        ELSE
            0 I FLOWSTAT !
            I FLASHER @ 0<>
                IF
                    -1 I FLASHER !
                    1 CHGFLASH !
                THEN
        THEN
    LOOP
;
: OKFLOW
    OMUX PARAMETERS !
    9 COMMAND !
    LITE.BD ADDRESS !
    0 \ INITIALIZE STK FOR POSITIONS ARRAY
    14 1 DO
        I FLOWSTAT @   0>
        IF
            DUP I 1- SWAP POSITIONS !
            1+
        THEN
    LOOP
    -1 SWAP POSITIONS !
    OPTOWARE ERRCHK
;
: BADFLOWON
```

```
        OMUX PARAMETERS !
        68 COMMAND !
        10 0 INFO !
        10 1 INFO !
        LITE.BD ADDRESS !
        0 \ INITIALIZE STK FOR POSITIONS ARRAY
        14 1 DO
            I FLOWSTAT @  9 >
            IF
                I 2* 2PWRS + @  FLASHERS +!
                1 I FLASHER !
                DUP I 1- SWAP POSITIONS !
                1+
            THEN
        LOOP
        -1 SWAP POSITIONS !
        OPTOWARE  ERRCHK
;
: BADFLOWOFF
        OMUX PARAMETERS !
        27 COMMAND !
        LITE.BD ADDRESS !
        0 \ INITIALIZE STK FOR POSITIONS ARRAY
        14 1 DO
            I FLASHER  @ -1 =
            IF
                I 2* 2PWRS + @ NEGATE FLASHERS +!
                0 I FLASHER !
                DUP I 1- SWAP POSITIONS !
                1+
            THEN
        LOOP
        -1 SWAP POSITIONS !
        OPTOWARE  ERRCHK
;
: INITTMR
        OMUX PARAMETERS !
        75 COMMAND !
        10 0 INFO !
        LITE.BD ADDRESS !
        OPTOWARE  ERRCHK
;
: .LITES
        CR ."    FLOW LITE STATUS "   CR
        ."          1 2 3 4 5 6 7 8 10 11 12 13 " CR
        ." STEADY        "
        14 1 DO
            I FLOWSTAT ?
        LOOP
        CR
        ." FLASHERS "
        14 1 DO
            I FLASHER ?
        LOOP
        CR
;
: FLOWLITES
        CHKFLOW
```

```
    OKFLOW
    CHGFLASH @ 0<>
        IF
            BADFLOWON
            BADFLOWOFF
        THEN
;
: TASK   ." CMDTEST   " ;
VARIABLE QUIT
: QT  -1 QUIT ! ;

VARIABLE BUFFER 160 ALLOT
    BUFFER 160 0 FILL
: RESET
    CR
    ." ENTER STARTING MILEPOST NUMBER FOLLOWED BY A RETURN"
    CR
    BUFFER 1+ 5 EXPECT
    0 0 BUFFER CONVERT
    DROP DROP
    CR ." CONSUMPTION DATA RESET "
    CR ." STARTING MILEPOST IS " DUP . CR
    START
;
: DOSET
    CR
    ." ENTER CORRECT MILEPOST NUMBER FOLLOWED BY A RETURN "
    ." AT THE MILEPOST. "
    CR
    BUFFER 1+ 5 EXPECT
    0 0 BUFFER CONVERT
    DROP DROP
    CR ." MILEPOST NUMBER IS RESET TO " DUP . CR
    SET
;
: OOPS    CR  ." OOPS "  CR ;
: DOKEY
    KEY
    CASE
         82 OF .RPM        ENDOF \ R
        114 OF .RPM        ENDOF \ r
         71 OF .GATE       ENDOF \ G
        103 OF .GATE       ENDOF \ g
        116 OF PRTTOTDATA  ENDOF \ t
         84 OF PRTTOTDATA  ENDOF \ T
         77 OF PRTMIDATA   ENDOF \ M
        109 OF PRTMIDATA   ENDOF \ m
        115 OF DOSET       ENDOF \ s
         83 OF DOSET       ENDOF \ S
         99 OF .CORRECTIONS ENDOF \ c
         67 OF .CORRECTIONS ENDOF \ C
         81 OF QT          ENDOF \ Q
        113 OF QT          ENDOF \ q
         90 OF RESET       ENDOF \ Z
        122 OF RESET       ENDOF \ z
            OOPS
    ENDCASE
;
: TASK    ."       CA!   " ;
```

```
: GET1#
    BUFFER 1+ 1 EXPECT
    0 0 BUFFER CONVERT
    DROP DROP
;
: GET2#
    BUFFER 1+ 2 EXPECT
    0 0 BUFFER CONVERT
    DROP DROP
;

: GETZONE    ( LEAVES ZONE ON STK )
    CR
    ." ENTER THE ZONE TO BE CALIBRATED "
    30 SPACES ." ZONE #"
    ."                   OR 0 TO QUIT      " CR
    62 SPACES
    GET2#
    CR
    DUP 13 >
       IF
          DROP
          ."   OOPS !!!   TRY AGAIN "
          62 SPACES GET2#
          DUP 13 > IF 0 THEN
       THEN
    DUP ZONE !
    DUP 2* 2PWRS + @ DIFF +!
    GATEINDX   RPMINDX
    DUP DUP 3 = SWAP 11 = OR
       IF
          6 TOP !
       ELSE
          4 TOP !
       THEN
;
VARIABLE BIN
: GETBIN
    CR
    ." ENTER A NUMBER 1 THRU 4/6 FOR BINS A THRU D" CR
    50 SPACES ." BIN #" .
    GET1#
    DUP TOP @ >
       IF
          DROP TOP @
       ELSE
       DUP 0 <
       IF
          DROP 0
       THEN
    THEN
    1-   BIN !
;
: GETGATEPOS
    CR
    ." ENTER A NUMBER 1 OR 0 FOR MAX OR MIN GATE " CR
    40 SPACES ." GATE POSITION "
    GET1#
    0>
```

```
            IF
                1
            ELSE
                0
            THEN
         GINDX @ BIN @ + GNEW !
;

: GETCALRPM
     CR
     ." THE RPM WILL BE 30 UNLESS ANOTHER NUMBER IS ENTERED " CR
     70 SPACES ." RPM   "
     GET2#
     DUP 0>
        IF
           DUP 60 >
           IF
              DROP 60
           THEN
        ELSE
           DROP 30
        THEN
     BIN @ RINDX @ + RPM !
;
: TIMEIT
     SECONDS@
     DUP 0>
     IF
        1-
     THEN
     CR
     BEGIN
                DUP .
                DUP SECONDS@
                DUP . 13 EMIT
                =
     UNTIL

: CAL
     0 DIFF !
     RPMS 60 0 FILL
     GNEWS 112 0 FILL
     CR CR CR CR CR CR
     CR CR CR CR CR CR
     CR CR CR CR CR CR
  BEGIN
     GETZONE
  0>
  WHILE
     BEGIN
        GETBIN
        BIN @ 1+  0> WHILE
           GETCALRPM
           GETGATEPOS
        REPEAT
  REPEAT
```

```
    .RPM  .G. ;/
    CHGRPM
    DIFF @ NEGATE DIFF !
    TURNON
    CHGGATE
      TIMEIT
    DIFF @ NEGATE DIFF !
    TURNOFF
;

: INITGATE
    30 0 DO
      10 I RPM !
    LOOP
    CHGRPM
    -8191 DIFF !
    TURNON
\   14 1 DO
\       I 2* 2PWRS + @
\       I STATUS !    \ ENABLE ALL GATES
\   LOOP
    56 0 DO
        1 I GATE !  \ MAKE BELIEVE ALL GATES OPEN
    LOOP
    GNEWS 114 0 FILL
\ .GTS
    CHGGATE
    SECONDS@
    DUP 56 >
        IF
            DROP 2
        ELSE
            2 +
        THEN
    CR
    BEGIN
        DUP .
        DUP SECONDS@
        DUP . 13 EMIT
        <
    UNTIL
    DROP
    CHGGATE
    8191 DIFF !
    TURNOFF
;
: RUN
    0 QUIT !
    CLEAR.BUF  \ TO CHECK FOR KEY
    CONFIGURE
    INITGATE
    INITTMR
    ETIME  STARTCTR
    PRINTOFF
    BEGIN
        DO.SWCHES
        CHK.MPHTMR
        MASTERSW @  1 =
```

```
            IF
                NSTATE
                CMPSTATES
                CHGMPH @ 1 =
                    IF
                        CHKGATE
                        0 CHGMPH !
                        DOCONSUMPTION
                    THEN
                ELSE
                    0 NEWSTATE !
                    CMPSTATES
            THEN
            MPHDN @ 0>
            IF
                DOCONSUMPTION
                0 MPHDN !
                FLOWLITES
                .LITES
            THEN
            ." STATUS = " STAT ? ."     MPH = "  MPHR ?
            ."      TIME   " TIME@ .TIME 8 SPACES 13 EMIT
        ?KEY
        IF
        DOKEY
        THEN
    QUIT @ 0<>
    UNTIL
CR  ." EXIT " CR
CLEAR.BUF
CR  ." CLEARED BUFFER " CR
0 NEWSTATE !
CMPSTATES
FLOWLITES
." SHUTDOWN STATUS = " STAT ? ."     MPH = "  MPHR ?
."      TIME   " TIME@ .TIME 8 SPACES CR
```

What is claimed is:

1. A metering rotor for use in metering granular material comprising:
 a rotor having an axis of rotation and an outer circumferential surface having multiple discrete indentations arranged in the surface in circumferential rows with each of the rows offset with respect to adjacent rows such that any radial plane including the axis contains a substantially constant cross section of the indentations.

2. The rotor of claim 1, wherein each of the indentations has a volume in the range of about 35 to about 350 cubic millimeters.

3. The rotor of claim 1, wherein the indentations are cylindrical.

4. The rotor of claim 3, wherein the indentations are cylindrical about axes that are parallel to the rotor axis.

5. The rotor of claim 4, wherein each of the cylindrical indentations is configured to comprise less than half of a cylinder.

6. An apparatus for metering granular material substantially without pulsing and attrition comprising:
 a rotor having an axis of rotation and an outer circumferential surface having indentations arranged in the surface in circumferential rows with each of the rows offset with respect to adjacent rows such that any radial plane including the axis contains a substantially constant cross section of the indentations;
 a housing for partially enclosing and supporting the rotor, the housing having a first and a second opening, each of the openings providing access to the rotor surface, the openings spaced from one another;
 a gate having a cylindrical surface positionable between the housing and the rotor to selectively control the size of the first housing opening; and
 a blocking mechanism positioned adjacent the rotor cylindrical surface to prevent excess material from entering the first housing opening,
 whereby when the material is fed by gravity to the first housing opening, the rotor is rotated with respect to the gate and the housing, and the gate is positioned to open the first housing opening, then the material is metered through the apparatus and out the second housing opening.

7. The apparatus of claim 6, wherein each of the indentations has a volume in the range of about 35 through about 350 cubic millimeters.

8. The apparatus of claim 6, wherein the indentations are cylindrical.

9. The apparatus of claim 8, wherein the indentations are cylindrical about axes that are parallel to the rotor axis.

10. The apparatus of claim 9, wherein each of the cylindrical indentations is configured to comprise less than half a cylinder.

11. The apparatus of claim 6, wherein the gate has a stepped edge configured such that when the gate is in a first fully opened position with respect to the housing, granular material can enter through the first housing opening into a first set of the circumferential rows of the indentations and when the gate is in a second partially closed position with respect to the housing, granular material can enter through the first housing opening into less than the first set of the circumferential rows of the indentations.

* * * * *